United States Patent
Rahman

(10) Patent No.: US 11,907,804 B2
(45) Date of Patent: Feb. 20, 2024

(54) FEDERATED QUANTUM COMPUTING DISTRIBUTED ARCHITECTURE

(71) Applicant: AT&T Intellectual Property I, L.P., Atlanta, GA (US)

(72) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 528 days.

(21) Appl. No.: 17/140,848

(22) Filed: Jan. 4, 2021

(65) Prior Publication Data

US 2022/0215279 A1 Jul. 7, 2022

(51) Int. Cl.
| | |
|---|---|
| *G06N 10/00* | (2022.01) |
| *G06F 8/41* | (2018.01) |
| *B82Y 20/00* | (2011.01) |
| *H04B 10/70* | (2013.01) |
| *G01C 19/72* | (2006.01) |
| *B82Y 10/00* | (2011.01) |
| *G02F 1/35* | (2006.01) |

(52) U.S. Cl.
CPC .............. *G06N 10/00* (2019.01); *B82Y 10/00* (2013.01); *B82Y 20/00* (2013.01); *G01C 19/72* (2013.01); *G01C 19/721* (2013.01); *G02F 1/3519* (2013.01); *G06F 8/41* (2013.01); *H04B 10/70* (2013.01)

(58) Field of Classification Search
USPC ........................................................ 716/100
See application file for complete search history.

(56) References Cited

U.S. PATENT DOCUMENTS

| | | |
|---|---|---|
| 2004/0128383 A1 | 7/2004 | Hinton |
| 2012/0155870 A1 | 6/2012 | Harrison et al. |
| 2016/0292586 A1 | 10/2016 | Rigetti et al. |
| 2017/0147303 A1* | 5/2017 | Amy ..................... G06N 10/00 |
| 2018/0114138 A1 | 4/2018 | Monroe et al. |

(Continued)

OTHER PUBLICATIONS

Grumbling, Emily et al., "Quantum Computing: Progress and Prospects", The National Academies Press, http://nap.edu/25196, 2019, 272 pages.

(Continued)

*Primary Examiner* — Bryce M Aisaka
(74) *Attorney, Agent, or Firm* — Guntin & Gust, PLC; John Rauch

(57) ABSTRACT

Aspects of the subject disclosure may include, for example, obtaining instructions for implementing a quantum algorithm adapted to obtain a computational result according to a quantum mechanical process. A sequence of quantum operations is generated according to the instructions for implementing the quantum algorithm, wherein the sequence of quantum operations is adapted to physically manipulate a plurality of quantum bits according to the quantum mechanical process. The sequence of quantum operations is provided to a geographically separated quantum central module, via a communication channel, the geographically separated quantum central module implements the quantum mechanical process to obtain a computational result. The computational result is received from the geographically separated quantum central module via the communication channel. Other embodiments are disclosed.

20 Claims, 10 Drawing Sheets

(56) References Cited

U.S. PATENT DOCUMENTS

| | | |
|---|---|---|
| 2018/0267539 A1 | 9/2018 | Shih |
| 2018/0365585 A1 | 12/2018 | Smith et al. |
| 2019/0019103 A1 | 1/2019 | Dadashikelayeh |
| 2019/0087237 A1 | 3/2019 | Dadashikelayeh et al. |
| 2019/0392342 A1 | 12/2019 | Leipold et al. |
| 2019/0393397 A1 | 12/2019 | Leipold et al. |
| 2020/0050959 A1 | 2/2020 | Ashrafi |
| 2020/0058702 A1 | 2/2020 | Kelly et al. |
| 2020/0119748 A1 | 4/2020 | Lucarelli |
| 2020/0125985 A1* | 4/2020 | Narang .............. H03K 19/20 |
| 2020/0134503 A1 | 4/2020 | Lupton |
| 2022/0067563 A1* | 3/2022 | Bonderson .......... H01L 29/26 |

OTHER PUBLICATIONS

Kekki, Sami et al., "MEC in 5G Networks", ETSI White Paper No. 28, First Edition—Jun. 2018, Jun. 2018, 28 pages.

Reznik, Alex et al., "MEC in an Enterprise Setting: a Solution Outline", ETSI White Paper No. 30, First edition—Sep. 2018, Sep. 2018, 20 pages.

Sprecher, Nurit et al., "Harmonizing Standards for Edge Computing", A synergized architecture leveraging ETSI ISG MEC and 3GPP specifications, ETSI White Paper #36, 1st edition—Jul. 2020, Jul. 2020, 14 pages.

Yu, Nengkun et al., "Protocols for Packet Quantum Network Intercommunication", Mar. 26, 2019, 14 pages.

\* cited by examiner

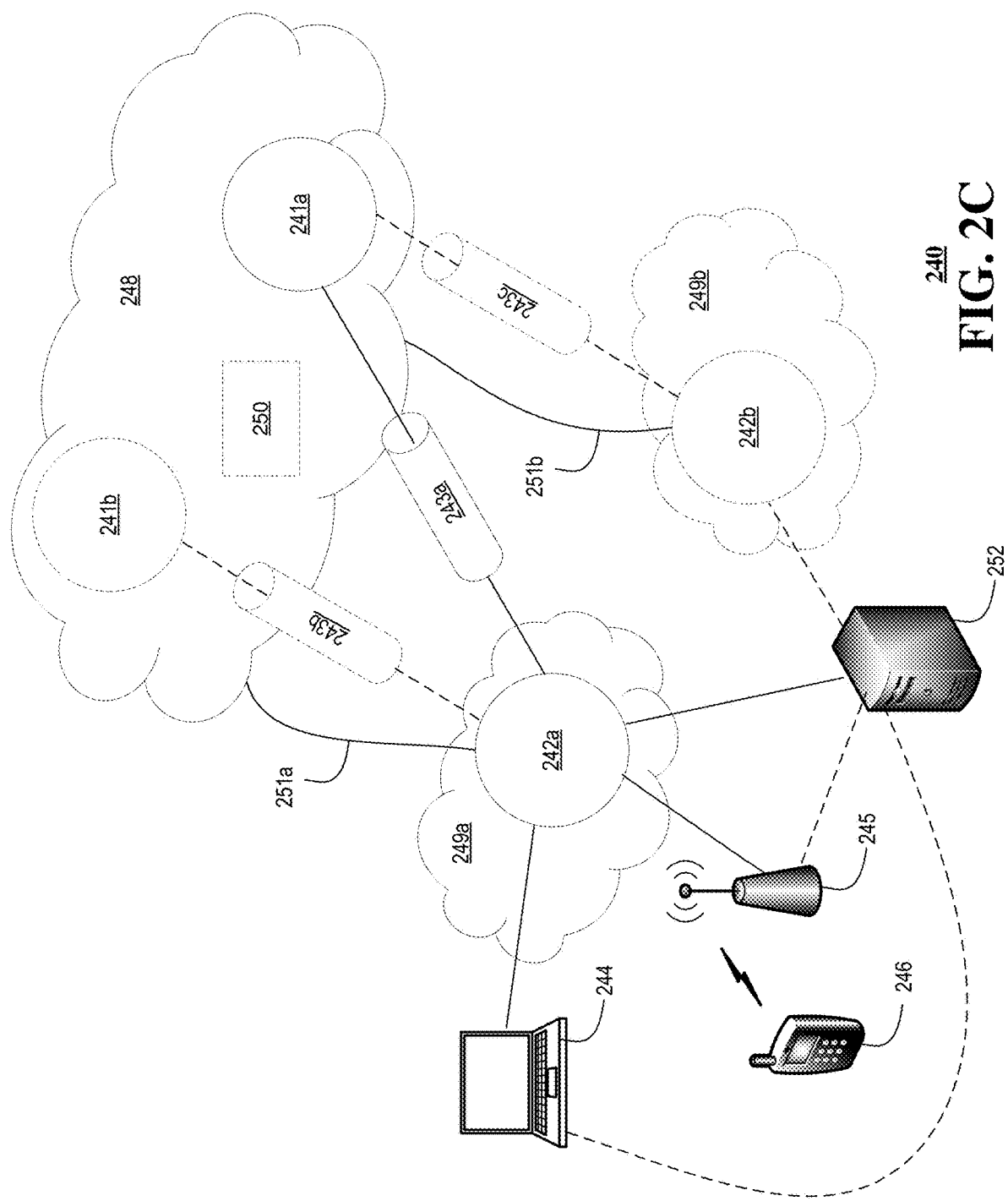

FEDERATED QUANTUM COMPUTING DISTRIBUTED ARCHITECTURE

FIELD OF THE DISCLOSURE

The subject disclosure relates to a federated quantum computing distributed architecture.

BACKGROUND

Quantum computing generally involves storage or processing of information according to quantum mechanical states of light or matter. Information stored in these systems may display the quantum properties of the storage medium. These properties are different from classical Newtonian laws of physics that govern classical computing hardware. Significant evidence shows that the quantum computing paradigm allows certain advantages; for example, some problems can be solved by a quantum computer using exponentially fewer resources (e.g., time, memory size, energy) than would be used by the best known classical algorithms and computing systems.

A fundamental unit of quantum information in a two-level quantum system is the qubit. Unlike a classical bit, which may have a value of either 0 or 1, the qubit may exist in coherent superpositions of its two states, denoted as $|0\rangle$ and $|1\rangle$. These basis states may be represented by quantum mechanical properties, for example, photonic polarization, atomic spin states, electronic states of an ion or charge states of superconducting systems. Other higher-level quantum systems may permit superpositions of more than two quantum states. For such instances, the unit of quantum information may be referred to more generally as a "qudit."

One way of transferring quantum information between two locations uses the technique known as "quantum teleportation." The teleportation process makes uses of two entangled qubits, known as a Bell pair, situated at respective ones of different locations between which the quantum information is transferred. The creation of such a Bell pair may be facilitated by a photon or photons sent over an optical channel (for example a free-space channel, an optical waveguide such as optical fiber or silicon channels within a chip). The encoded photons, or qubits, may be directed toward a receiver adapted to analyze the quantum bits to detect encoded information.

Whatever happens to a quantum property of one of the entangled qubits, e.g., spin or photonic polarization, influences the quantum property of the other instantaneously, in a predictable manner without regard to their distance of separation. If a first of one of the entangled particles allows it to interact with a memory qubit that holds information to be exchanged, the interaction changes the state of the particle, e.g., photon. Through quantum entanglement, the state of the entangled photon at the second recipient changes instantaneously. Such quantum teleportation also requires that information relating to the quantum states be shared between remote entities via a classical communication channel. The quantum state information, together with the observable quantum properties, may be used to exchange information in a secure manner.

BRIEF DESCRIPTION OF THE DRAWINGS

Reference will now be made to the accompanying drawings, which are not necessarily drawn to scale, and wherein:

FIG. 2C is a block diagram illustrating yet another example, non-limiting embodiment of a quantum computing system functioning within the communication network of FIG. 1.

DETAILED DESCRIPTION

Figure 1:
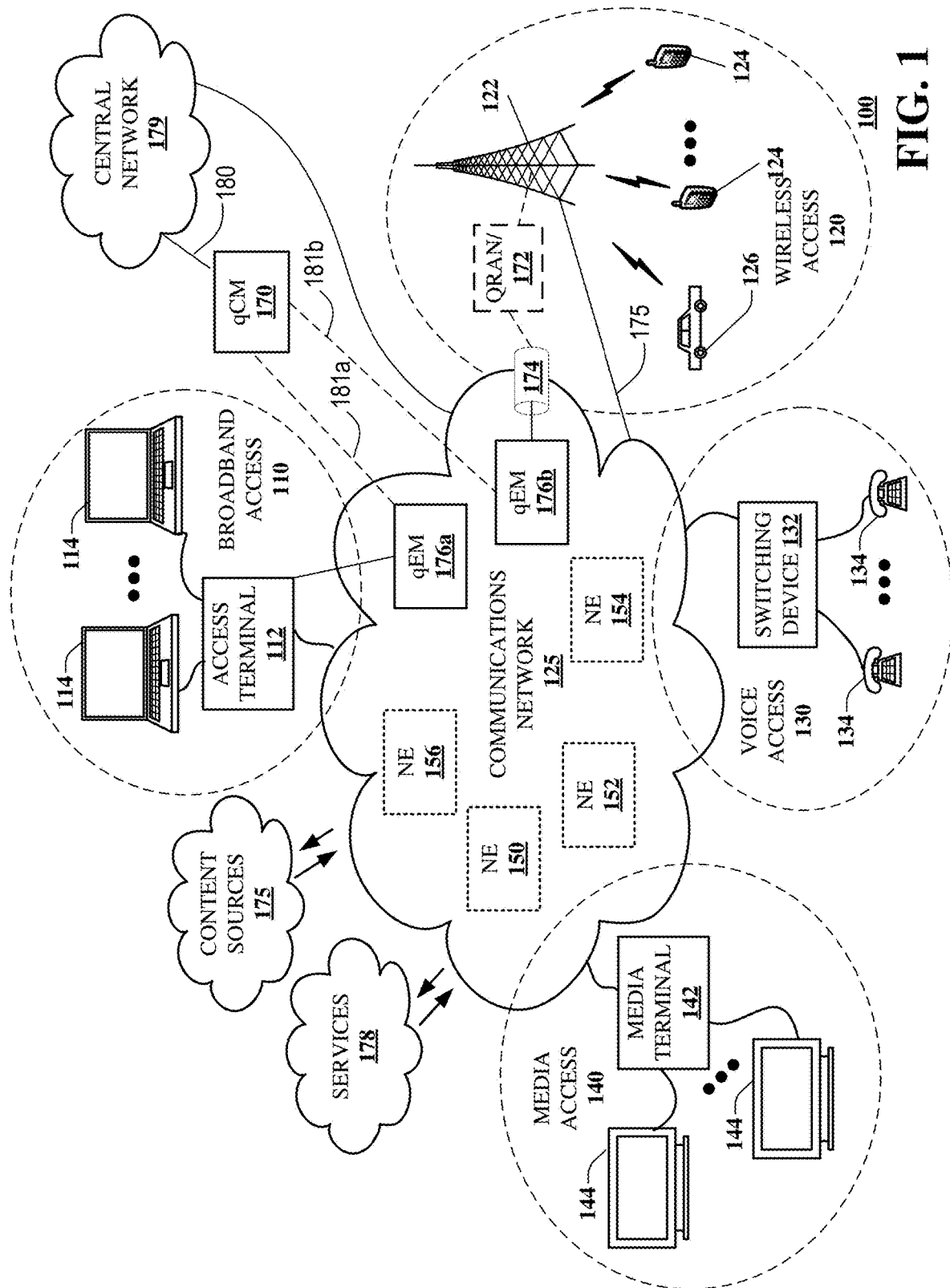
FIG. 1 is a block diagram illustrating an exemplary, non-limiting embodiment of a communications network in accordance with various aspects described herein.

The subject disclosure describes, among other things, illustrative embodiments of a quantum computing infrastructure or platform, referred to herein as a federated quantum computing architecture, consisting of at least two geographically separate systems that cooperatively implement quantum algorithms adapted to obtain computational results based upon quantum mechanical processes.

One or more aspects of the subject disclosure include a quantum computing system that includes a first quantum edge processing system having a processor and a memory. The memory stores executable instructions that, when executed by the processing system, facilitate performance of operations. The operations include receiving instructions for implementing a quantum algorithm adapted to obtain a computational result according to a quantum mechanical process. A sequence of quantum operations is determined according to the instructions for implementing the quantum algorithm, wherein the sequence of quantum operations is adapted to physically manipulate a plurality of quantum bits according to the quantum mechanical process. The sequence of quantum operations is forwarded to a geographically separated quantum central module, via a communication channel. The geographically separated quantum central module implements the quantum mechanical process to obtain a computational result, which is received from the geographically separated quantum central module via the communication channel.

One or more aspects of the subject disclosure include a process, that includes obtaining, by a processing system including a processor, instructions for implementing a quantum algorithm adapted to obtain a computational result according to a quantum mechanical process. A sequence of quantum operations is determined, by the processing system, according to the instructions for implementing the quantum algorithm, wherein the sequence of quantum operations is adapted to physically manipulate a plurality of quantum bits according to the quantum mechanical process. The sequence of quantum operations is forwarded, by the processing system, to a geographically separated quantum central module, via a communication channel. The geographically separated quantum central module implements the quantum mechanical process to obtain a computational result, which is obtained, by the processing system, from the geographically separated quantum central module via the communication channel.

One or more aspects of the subject disclosure include a machine-readable medium, that includes executable instructions that, when executed by a processing system including a processor, facilitate performance of operations. The operations include obtaining instructions for implementing a quantum algorithm adapted to obtain a computational result according to a quantum mechanical process. A sequence of quantum operations is generated according to the instructions for implementing the quantum algorithm, wherein the sequence of quantum operations is adapted to physically manipulate quantum bits according to the quantum mechanical process. The sequence of quantum operations is provided to a geographically separated quantum central module via a communication channel. The geographically separated quantum central module implements the quantum mechanical process to obtain a computational result, which is received from the geographically separated quantum central module via the communication channel.

Quantum computing imposes many challenges in generating, storing and/or otherwise processing the physical qubits in a manner that generates, preserves and/or detects or otherwise measures quantum mechanical properties of physical entities, i.e., qubits. These challenges may include one or more of physical constraints, environmental constraints, and cost constraints. The example systems, devices and processes disclosed herein refer to a separation of subsystems of a quantum computer. Such a modular approach facilitates a sharing of at least some of the subsystems, which suggests a cost-effective approach. A particular class of sharing is referred to herein as a federated quantum computing architecture.

Scientists have conceptually modeled a quantum computing system has having multiple distinct abstract layers. Generally, quantum computers may include analog computers and/or gate-based computers. In a particular layered model, the inner workings of a quantum computer may be characterized into four distinct layers: (i) a quantum data layer; (ii) a control and measurement layer; (iii) a control processor layer, and a (iv) host processor layer. One or more of these layers may be allocated to different hardware subsystems that may be geographically dispersed and shared according to a modular, flexible, evolvable, cost effective and efficient architecture for quantum computing and quantum Internet. The physical qubits may reside in the quantum data layer. It is envisioned that the quantum data layer will require highly specialized equipment that may depend upon the particular physical entity or entities generated, stored and/or otherwise processed according to the quantum mechanical processes. Equipment may require cryogenic cooling to extreme temperatures approaching absolute zero. Alternatively or in addition, the equipment may include specialized electronic circuits, optical devices, waveguides radio frequency (RF) devices, and the like. Implementation of a quantum program or algorithm may include one or more of generation, storage, measurement and/or facilitation of interactions between qubits.

It is understood that according to currently available quantum processes, the quantum data layer may include specialized devices and/or modules adapted to store and/or facilitate interactions among qubits. It is further understood that operation of the quantum data layer, e.g., to perform one or more quantum operations, may rely upon carefully orchestrated control instructions and/or signals in order to function in a useful way. In at least some embodiments, this control may be managed using one or more conventional computers. Manipulation of qubits within the quantum data layer, as may be performed responsive to a quantum algorithm, may be accomplished by the control and measurement layer. As the underlying architecture of a quantum data layer may differ depending upon the physical nature of the qubits and/or the storage elements and/or the gates, it is envisioned that the control and measurement layer may depend upon the physical structure of the quantum data layer. For example, addressing stored qubits and/or facilitating interactions between qubits, such as gate operations, may require specialized control signals according to the particular physical attributes and/or construction of the quantum data layer.

A quantum algorithm may include a one or more quantum operations and/or measurements. In at least some instances, the quantum operations and/or measurements may be determined according to a particular quantum algorithm, that may be further arranged according to a particular sequence. Depending upon the algorithm and/or the sequence of corresponding operations, it is possible that at least some quantum measurement outcomes of previous operations may be used to inform subsequent quantum operations. It is understood that in at least some embodiments, the sequence of operations may depend to at least some extent upon the underlying architecture of one or more of the quantum data layer and/or the quantum control and measurement layer. For example, the sequence of operations may depend upon one or more of a type of qubit, a qubit storage architecture, whether the computer is analog or gate-based, the type(s) of gates available, and so on. In at least some embodiments, the control processor layer may be analogized with an assembler implanting a low-level programming language, i.e., an assembly code, that depends on specifics of the quantum data layer and/or the quantum control or measurement layer.

The host processor layer may include a classical computer that may be adapted to handle ancillary tasks, such as accessing networks, accessing large storage arrays, and/or providing user interfaces. The host processor may run a conventional operating system and/or user interface adapted to facilitates user interactions. In at least some embodiments, the host processor may also provide a high-bandwidth connection to a control processor implementing the quantum control processor layer. It is understood that the host processor layer may implement a high-level programming language, such as C/C++, by which a quantum algorithm may be described. The host processing layer may include supporting libraries and/or access to such supporting libraries. The host processing layer alone or in combination with the quantum control processor layer may permit a compiling and/or linking process by which a quantum algorithm is converted into a machine-type code suitable for implementation by the quantum control and measurement layer and/or the quantum data layer. In this manner, the different layers divide a complex quantum computing process into sub-processes that may be allocated to supporting hardware adapted for implementing functionality of the corresponding quantum computing layer. Without limitation, one or more of the layers may be independent and/or physically, e.g., geographically, separate from the other layers. Alternatively or in addition, one or more of the layers may share at least a portion of supporting hardware systems and/or modules.

A quantum computer that is employed to a particular problem or task, may eventually interface with one or more of users, data, other classical computers, and/or communication networks. The quantum computer may include and/or otherwise be in communication with one or more conventional computers. In at least some embodiments, a quantum computer may utilize the conventional computer(s) for tasks that conventional computers may excel at, and/or whenever it is most efficient to do so.

Referring now to FIG. 1, a block diagram is shown illustrating an example, non-limiting embodiment of a system 100 in accordance with various aspects described herein. For example, system 100 can facilitate in whole or in part, a federated quantum computing architecture. In at least some embodiments, the federated quantum computing architecture includes a quantum computing system includes at least two primary segments—a quantum central or core module (qCM) 170, e.g., a physical quantum chamber, that may be realized according to quantum mechanical technologies, and a quantum edge module (qEM) 176a, 176b, generally 176, that may be realized according to classical computer adapted to facilitate quantum control of the qCM 170 to perform quantum operations adapted to implement a quantum algorithm. These two modules 170, 176 may be geographically separated and in communication over a secure high-speed connection. According to the federated quantum computing architecture, the qCM 170 may be accessed and shared among multiple geographically diverse users by way of the one or more qEM 176. The qCM 170 may include devices and/or components specially adapted for physically manipulating and/or storing quantum particles, e.g., qubits.

According to the illustrative embodiment, the qCM 170 is provided via a central network 179. The central network 179 may be a physical network, e.g., at a data center with dedicated hardware components and systems, a virtual network, in which network functions are allocated to virtual network servers, or a combination of physical and virtual networks. In at least some embodiments, the central network 179 may be in communication with the communications network 125. It is envisioned that the qCM 170 may be located at a physical location, such as a university laboratory, an industrial complex, a military installation, and so on. The qCM 170 may not be physically maintained by a network service provider, but rather by a separate and distinct entity. Accordingly, in at least some embodiments, the qCM 170 may be in communication with a central network 179 via a communication link 180. The communication link 180 may include, without limitation, any classical communication links or channels, such as a coaxial cable, twisted pair, optical fiber, a radio link, cellular radio, WiFi, a satellite link, a free-space optical link, and combinations of thereof. Alternatively or in addition, the communications link 180 may include a quantum channel adapted to facilitate quantum-enabled communications between the qCM 170 and the central network 179.

In at least some embodiments, the qCM 170 is in further communication with one or more physically separate edge computing modules, e.g., the qEM 176, according to a mobile edge computing (MEC) or more generally, any network edge computing (NEC), which may be adapted to determine a sequence of quantum operations according to instructions for implementing quantum algorithms. Communications between the qCM 170 and the qEM 176 may be provided via the central network 179. Alternatively or in addition, the communications between the qCM 170 and the qEM 176 may be provided via any other suitable communication link 181a, 181b, generally 181, which may include a classical communication link, a quantum-enabled communication link, or any combination thereof.

According to a federated quantum computing platform, a least some of the supporting quantum mechanical processes are allocated to a common quantum computing core module (qCM) 170. Functionality of the qCM 170 is shared among distinct quantum edge modules (qEM) 176a, 176b, generally 176, that may be physically and/or geographically separated from each other and/or from the qCM 170. The federated architecture facilitates interoperability and/or information sharing between semi-autonomous, de-centrally organized entities. Accordingly, multiple quantum computing services may be deployed according to particular functional, e.g., business, requirements, while sharing functionality of the qCM 170 in an efficient and cost-effective manner.

According to the illustrative embodiment of the system 100, a communications network 125 is presented for providing broadband access 110 to a plurality of data terminals 114 via access terminal 112, wireless access 120 to a plurality of mobile devices 124 and vehicle 126 via base station or access point, referred to generally as a wireless access point (WAP) 122, voice access 130 to a plurality of telephony devices 134, via switching device 132 and/or media access 140 to a plurality of audio/video display devices 144 via media terminal 142. The WAP 122 may be in communication with the communications network 125 via a backhaul network or backhaul link 175. In at least some embodiments, the communications network 125 provides communication access to wireless devices that may or may not be mobile, such as drones and/or appliances, e.g., home appliances, security systems, and the like. Wireless communications access may include, without limitation machine-to-machine or machine-type communications, e.g., according to Internet of Things (IoT) applications. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In at least some embodiments, WAP 122 is adapted to communicate via a quantum channel, being referred to herein as a quantum-aware WAP 122. The quantum-aware WAP 122 may include a radio adapted to support wireless communications and a quantum processor adapted to support one or more quantum processes. The quantum-aware WAP 122 wireless communications may be implemented according to a wireless communication protocol, such as a wireless local area network (WLAN) protocol. Example WLAN protocols include any of these generally known to those skilled in the art, including the examples disclosed herein, such as any of the IEEE 802.11 protocols, e.g., Wi-Fi, or Bluetooth. In at least some embodiments, the quantum-aware WAP 122 may include a classical network interface, such as a network interface card, e.g., an Ethernet interface, adapted to connect to a classical communications channel, such as a classical communications backhaul channel 175 between the quantum-aware WAP 122 and an edge device of a mobility core network of the communications network 125. The quantum-aware WAP 122 is also in communication with the quantum channel 174.

Alternatively or in addition, the quantum-aware WAP 122 may include a quantum-aware radio access network (Q-RAN) terminal 172 (shown in phantom). The Q-RAN terminal 172 may include one or more radios adapted to support wireless mobile communications along with a quantum processor adapted to support one or more quantum processes. In at least some embodiments, the Q-RAN terminal 172 includes a quantum-aware base station and/or quantum-aware radio controller. The wireless mobile communications may be implemented according to one or more wireless mobile communication protocols, such as any of the example wireless mobility protocols disclosed herein or otherwise generally known to those skilled in the art. Example wireless mobility protocols include, without limitation, one or more of the example 3GPP LTE protocols, e.g., sometimes referred to generally as 3G, 4G, 5G and 6G. In at least some embodiments, the Q-RAN terminal 172 may include a classical network interface, such as a network interface card, e.g., an Ethernet interface, adapted to connect to a classical communications channel, such as a classical communications backhaul channel 175 between the Q-RAN terminal 172 and an edge device of a mobility core network of the communications network 125. The Q-RAN terminal 172 is also in communication with the quantum channel 174.

In at least some embodiments, backhaul communications of an active mobile communication session, e.g., providing mobile devices 124, 126 with access to back-end services, may be secured according to one or more quantum processes, such as implementing a quantum algorithm and/or the exchange of qubits via the quantum channel 174. Quantum processes may include, without limitation, one or more of any of the quantum processes disclosed herein, such as generation of qubits, generation of quantum entangled particles or qubits, transmission and/or receipt of qubits and/or quantum entangled particles or qubits, entanglement swapping, quantum teleportation, sensing of quantum states, evaluation of qubit values, detection of tampering by evaluation of quantum states, quantum key distribution (QKD), storage of entangled particles and/or qubits, quantum processing of qubits, e.g., according to quantum gates, and the like. A qubit is quantum mechanical analogue of a classical bit embodied in one or more of ions, electrons, and/or photons.

In at least some embodiments, the communications network 125 includes one or more quantum-aware devices, such as a quantum frontend server qEM 176. The qEM 176 may include a quantum processor adapted to support one or more quantum processes, as well as a traditional processing system, e.g., running an operating system, such as UNIX®, a registered trademark of X/Open Co. Ltd., Corp. of Berkshire, England, or Windows®, a registered trademark of Microsoft Corp., of Seattle, WA, and/or Apple® iOS, a registered trademark of Apple Corp. of Cupertino, CA The Q-FES 176 is in communication with one or more classical communications back-end links 175. The qEM 176 is also in communication with the quantum channel 174.

In at least some embodiments, the qEM 176 is in communication with one or more servers providing access to back-end services. The servers may be local, e.g., providing services offered by a network service provider of the mobility core network and/or the communications network 125. Alternatively or in addition, the services may be available from third party services 178, such as streaming media services, e.g., Pandora®, a registered trademark of Pandora Media, LLC, of Oakland CA, and Netflix®, a registered trademark of Netflix, Inc., of Los Gatos, CA Other services may include, without limitation, web-browsing, instant messaging, video chat, VoIP, teleconferencing, security monitoring, social media, such as Facebook®, a registered trademark of Facebook, Inc. of Menlo Park, CA, Twitter®, a registered trademark of Twitter, Inc., of San Francisco, CA, TikTok®, a registered trademark of Bytedance Ltd. of Grand Cayman, Cayman Islands, and so on.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
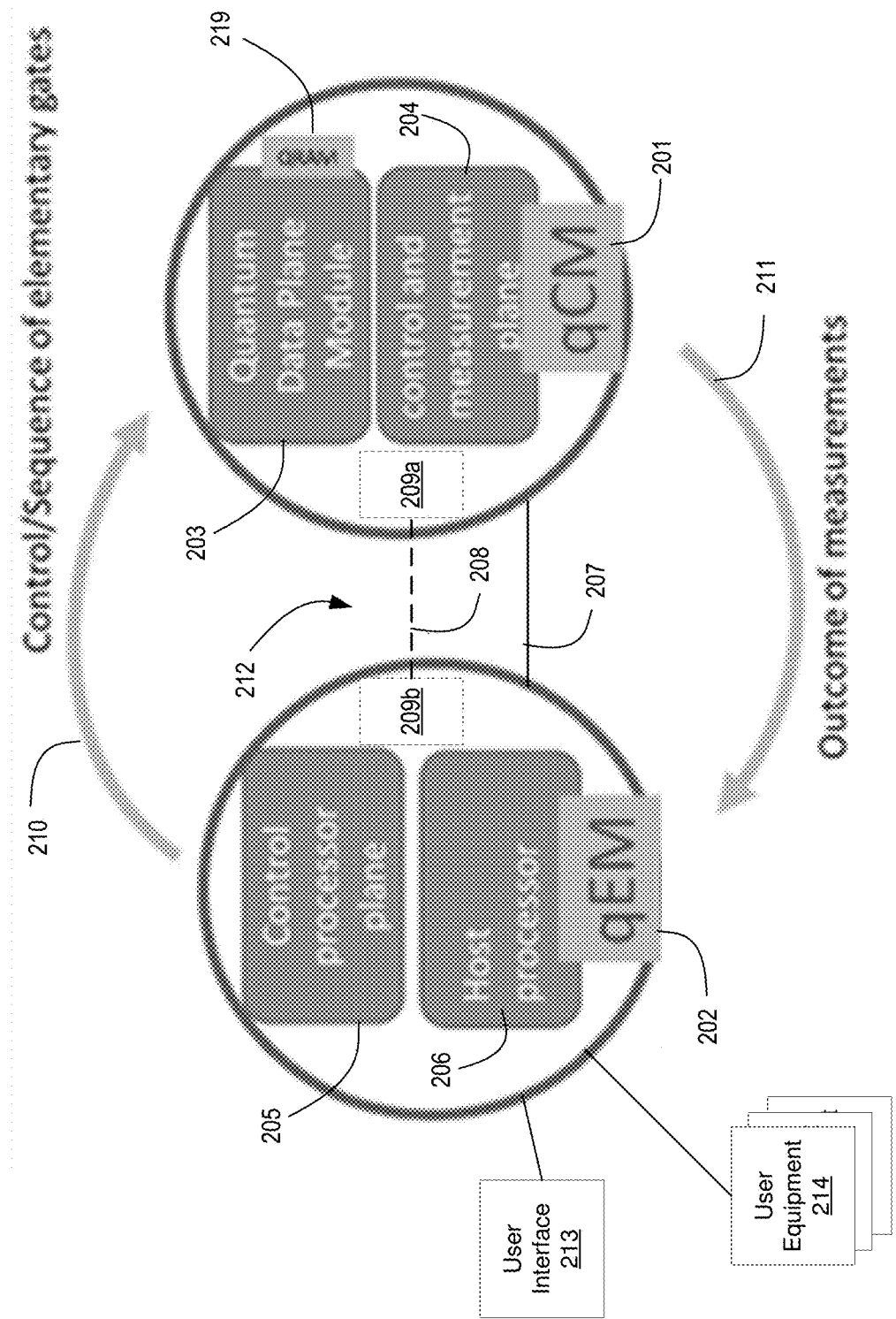
FIG. 2A is a block diagram illustrating an example, non-limiting embodiment of a quantum computing system functioning within the communication network of FIG. 1 in accordance with various aspects described herein.

FIG. 2A is a block diagram illustrating an example, non-limiting embodiment of a federated quantum computer system 200 functioning within the communication network 100 of FIG. 1 in accordance with various aspects described herein. The four, quantum hardware layering models are allocated to one or more components of the federated quantum computer system 200. In general, a centralized quantum computer is shared among many users and/or applications by way of one or more edge computing systems, which alleviates any requirement for providing an actual quantum computer physically at or near the network edge. The actual physical quantum computer may reside in a cloud, providing a shared quantum resource that would bring cost efficiency and flexibility.

The example quantum computing system includes two primary modules that may be geographically separated. The first module is a quantum core or central module (qCM) 201 and the second module is a quantum edge module (qEM) 202. The term edge suggests that the qEM 202 may be located in a relatively close proximity to one or more end users and/or end-user devices, whereas the term central suggest that the qCM 201 is provided at a remote location, which may or may not be central, but is otherwise remotely accessible by one or more qEM 202. According to the illustrative example, the qCM 201 is located in central location, e.g., a core cloud, while the one or more qEM 202 are located at edges of the network, e.g., one or more network edge clouds. The qEM 2002 may provide quantum control sequences 210, such as sequences of elementary gate operations to the qCM 201. The qCM 201, in turn, may provide an outcome of measurements 211 to the qEM 202.

The scale of the network may be relatively local, e.g., whereby the qCM 201 and the qEM 202 are located within a common geographic area or region, such as a city or metropolitan area. Accordingly, the qCM 201 and qEM 202 may be in communication via a dedicated communication channel and/or a metropolitan network. Other geographical groupings serviced by one qEM 202 may include, without limitation, a state, a group of states, e.g., New England, a country, a group of countries, e.g., Europe. These two modules could be connected over any secure, dedicated high speed classical or quantum connection (such qTCP). These qCM 201 and the qEM 202 may be connected over a high-speed classical communication channel 207, a quantum-enabled communication channel 208, such a quantum transmission control protocol (qTCP) 212. Providing the qCM 201 at a centralized location accessible by one or more qEMs 202 at physically separate locations may prove advantageous in view of the cost and functional constraints associated with a quantum-enabled processor.

In at least some embodiments the qEM 202 may include a quantum communications processor 209b in communication with the quantum channel 208 and in at least some embodiments, in communication with the classical communications channel 207. In at least some embodiments the qCM 201 may include a quantum communications processor 209a in communication with the quantum channel 208 and in at least some embodiments, in communication with the classical communications channel 207. In at least some embodiments, either or both of the quantum communication processors 209a, 209b, generally 209, may be separate from any of the control processor plane module 205, the host processor 206, the quantum data plane module 203 and the control and management plane module 204.

Considering the aforementioned four-layer, quantum hardware model, the example federated, quantum computing architecture has allocated the four layers into two physically distinct compartments or modules. The first physically distinct module corresponds to the qCM 201, which is configured to include at least two sub-modules. A first sub-module includes a quantum data plane module 203, which is adapted to provide functionality of the quantum data layer of the four-layer, quantum hardware model. A second module includes a control and measurement module 204, which is adapted to provide functionality of the control and measurement layer of the four-layer, quantum hardware model. In at least some embodiments, the qCM 201 may include a quantum memory device, such as a quantum random access memory (qRAM) 219. The qRAM 219 may be adapted to store quantum state information, e.g., qubits. Alternatively or in addition, the qRAM 219 may be adapted to store control and/or measurement information, such as instructions and/or measurements including partial measurement results. It is envisioned that in at least some embodiments, the qRAM 219 may enhance quantum computer processing speed and/or capacity.

Although a single qEM 202 is illustrated as being in communication with the qCM 201, it is understood that more than one different qEM 202 may be in communication with the same qCM 201. In some embodiments, access to the qCM 201 may be provided according to a schedule, e.g., in which one qEM 202 may access the qCM 201 at any given time. For example, access to the qCM 201 may be provided on a per-job bases in which exclusive access to the qCM 201 may be permitted for one of a group of qEMs 202. Such access may remain exclusive until a particular processing task or job has been completed, e.g., completion of a quantum algorithm, and/or completion of a step or sub-module of a quantum algorithm. In such exclusive scheduling, it is understood that quantum states, quantum operation results and/or partial results may be retained in whole or in part by the qCM 201, e.g., as may be stored within the qRAM 219. Alternatively or in addition, quantum states, quantum operation results and/or partial results may be cleared, or otherwise not protected from overwriting by subsequent processes and/or operations. Alternatively or in addition, access to the qCM 201 may be provided according to some other schedule or metric, such as a time interval, according to a number of operations and/or number of qubits associated with quantum operations. It is understood that one or more metrics may be applied concurrently, such that access may be provided on a per-job bases, unless the job exceeds another metric, such as time, quantum measurements, and/or stored qubits.

By way of further example, access to the qCM 201 may be shared in a manner that permits more than one user to access the qCM 201 in a concurrent manner. The more than one users may include separate quantum processing jobs, e.g., separately processed quantum algorithms. The more than one users may access the same qCM 201 via a common qEM 202. Alternatively or in addition, at least some of the users may access the same qCM 201 via different qEMs 202. Such access may be managed by allocating a first group of physical quantum assets, such as qubits, qubit storage locations and/or qubit gates to one user and a second group of physical quantum assets to another user. Alternatively or in addition, one or more of the same physical quantum assets may be shared, being allocated according to a scheduling process of the qCM 201. It is envisioned that quantum control and/or measurement commands and/or quantum measurement results may be stored, at least temporarily using the qRAM 219. Such local storage permits storage of commands and results including partial results to facilitate management of multiple users to a common qCM 201.

The second physically distinct module corresponds to the qEM 202, which is configured to include at least two sub-modules. A first sub-module includes a quantum processor plane module 203, which is adapted to provide functionality of the quantum processor layer of the four-layer, quantum hardware model. A second sub-module includes a host processor 206, which is adapted to provide functionality of the host processor layer of the four-layer, quantum hardware model. The host processor 206 may reside on a server of a network edge cloud. Alternatively or in addition, the host processor 206 may reside separate from the network edge cloud, but otherwise accessible to the network edge cloud, e.g., via a network connection, such as the Internet.

The host processor 206 may facilitate formulation of a quantum algorithm. For example, the host processor may be hosted on a classical computer running one or more available operating systems. The host processor 206 may be controlled, e.g., by programming instructions to execute structured programs. In at least some embodiments, the structured programs may include function calls, subroutine calls, and/or direct program steps related to a quantum algorithm. For example, a program hosted on the host processor 206 may include a function call to a quantum algorithm adapted to obtain a computational result according to a quantum mechanical processes. The function call may be processed by the control processor plane module 205 to obtain one or more quantum operations. The quantum operations are adapted to physically manipulate one or more qubits according to the quantum algorithm. The quantum operations may include quantum measurements by which quantum properties of the qubits may be identified.

In at least some embodiments, the host processor 206 provides access to a quantum algorithm and/or a quantum operation according to a selection from among a group of quantum algorithms and/or quantum operations. Selections may be obtained via a user interface 213, e.g., responsive to a user selection from a graphical user interface presenting the selectable options. Alternatively or in addition, the selections may be obtained or otherwise identified via a program that may be executed by the host processor, or via a program that may be executed remote from the host processor, e.g., via a user interface on another device, such as a workstation, a tablet device, a smart phone, a laptop computer, a smart appliance, such as a smart TV, a machine-to-machine process, e.g., according to an Internet of things (IoT) application, and the like. It is understood that user selections may also be made locally, e.g., at the user interface 213 of the host processor 206 and/or remotely, e.g., via user equipment 214 that may include any of the aforementioned devices that may be in communication with the qEM 202.

In at least some embodiments, the quantum operations may be dependent upon an architecture of the quantum data plane module 203. The quantum operations may be transported to the qCM 201 via a communication channel 212. The host processor 206 may provide a structured access to quantum processes of the qCM 201.

The quantum data plane module 203 may be referred to as the "heart" of a quantum computer. The quantum data plane module 203 includes the physical qubits and the structures needed to hold them in place. It also contains supporting circuitry as may be necessary to measure the qubits' state and perform gate operations on the physical qubits for a gate-based system or control the Hamiltonian for an analog computer. The supporting circuitry may also facilitate routing of control signals to selected qubit(s), e.g., to set the Hamiltonian it sees, which may be used to control the quantum gate operation for a digital quantum computer. For gate-based systems, since some qubit operations require two qubits, the quantum data plane module 203 may provide a programmable "wiring" network that enables selectable ones of any two or more qubits to interact. Analog systems may require richer communication between the qubits, which can also be supported by the quantum data plane module 203. High qubit fidelity generally requires strong isolation from the environment, which has the effect of limiting connectivity—it may not be possible for every qubit to interact directly with every other qubit—so the computation needs to be mapped to the specific architectural constraints of the quantum data plane module 203. These constraints suggest that both the operation fidelity and connectivity are important metrics of the quantum data layer.

Unlike a classical computer, where both the control plane and the data plane components use the same silicon technology and are integrated on the same device, control of the quantum data plane module 203 may include a technology that differs from that of the physical qubits. In at least some embodiments, control of the quantum data plane may be done externally, e.g., by a distinct and, in at least some embodiments, separate control and management plane module 204. In order to implement the quantum operations to further the quantum algorithm, control information for the qubits, which may be analog in nature, must be sent to a correct qubit (or qubits). In some systems, this control information is transmitted electrically using wires, so these wires are part of the quantum data plane; in others, it is transmitted with optical or microwave radiation. Transmission must be implemented in a manner that has high specificity, so it affects only the desired qubit(s), without disrupting the other qubits in the system. This becomes increasingly difficult as the number of qubits grows; the number of qubits in a single module is therefore another important parameter of a quantum data layer.

The control and management plane module 204 converts the control processor plane module's 205 digital signals, which indicates what quantum operations are to be performed, to the suitable, e.g., analog, control signals as may be required to perform the operations on the qubits in the quantum data plane module 203. The control and management plane module 204 may also convert an output, e.g., and analog output, of measurements of qubits in the quantum data plane module 203 to another form, such as classical binary data, that the control processor plane module 205 is adapted to handle. The generation and transmission of control signals may be challenging, e.g., due to an analog nature of at least some quantum gates. Small errors in control signals, and/or irregularities in the physical design of the qubit, may affect the results of operations. The errors associated with each gate operation may accumulate as the machine runs.

Any imperfection in the isolation of these signals (so-called signal crosstalk) may cause small control signals to appear for qubits that should not otherwise be addressed during an operation, leading to small errors in their qubit state. Proper shielding of the control signals is complicated by the fact that they must be fed through the apparatus which isolates the quantum date plane from its environment by vacuum, cooling, or both; this requirement constrains the type of isolation methods which are possible.

Fortunately, it is understood that both qubit manufacturing errors and signal crosstalk errors are systematic, changing slowly with the mechanical configuration of the system. Effects of these slowly changing errors can be minimized by using control pulse shapes that reduce dependence of the qubit on these factor, and/or through periodic system calibration. In at least some embodiments, the federated quantum computer system 200 includes a mechanism adapted to measure errors and/or software to adjust the control signals to drive these errors to zero, e.g., during a system calibration. Since every control signal can potentially interact with every other control signal, the number of measurements and computation required to achieve this calibration more than doubles as the number of qubits in the system doubles.

The particulars of control signals of a federated quantum computer system 200 generally depends upon a underlying qubit technology. For example, systems using trapped ion qubits usually rely upon microwave or optical signals (forms of electromagnetic radiation) transmitted through free space or waveguides and delivered to the location of the qubits. Superconducting qubit systems are controlled using microwave and low-frequency electrical signals, both of which are communicated through wires that run into a cooling apparatus (including a "dilution refrigerator" and a "cryostat") to reach the qubits inside the controlled environment.

Unlike classical gates, which have noise immunity and negligible error rates, quantum operations depend upon the precision with which control signals are delivered and have nonnegligible error rates. Obtaining this precision currently requires sophisticated generators built using classical technologies. Since no quantum gate can be faster than the control pulse that implements it, even if the quantum system in principle allows ultrafast operation, the gate speed will be limited by the time required to construct and transmit an exquisitely precise control pulse. Fortunately, the speed of today's silicon technology is fast enough that gate speed is limited by the quantum data plane, and not the control and measurement plane. This gate speed is currently tens to hundreds of nanoseconds for superconducting qubits and one to a hundred microseconds for trapped ion qubits.

According to the illustrative example, the qEM 202 of the federated quantum computer system 200 has two modules: a quantum processor plane module 205; and a host processor 206. The example quantum processor plane module 205 identifies and triggers a proper Hamiltonian and/or sequence of quantum gate operations and measurements, which are subsequently carried out by the control and management plane module 204 on the quantum data plane module 203. These sequences execute the program, provided by the host processor, for implementing a quantum algorithm. Programs may be customized for the specific capabilities of the quantum layer by the software tool stack, as discussed.

In at least some embodiments, the federated quantum computer system 200 includes error correction capability. For example, the control processor plane module 205 may be adapted to implement a quantum error correction algorithm. An important and challenging task of the control processor plane module 205 is running a quantum error correction algorithm. Significant classical information processing is required to compute the quantum operations needed to correct errors based upon the measured syndrome results, and the time required for this processing may slow the operation of the quantum computer. This overhead is minimized if the error correction operations can be computed in a time comparable to that required for the quantum operations and measurements. Since this computational task grows with the size of the machine (the inputs and outputs of the function scale with the number of qubits, and the complexity scales with the "distance" of the error-correcting code), it is likely that this control processor plane will consist of multiple interconnected processing elements to handle the computational load.

The control processor plane module 205 may interface with the control and management plane module 204. In at least some embodiments, the control processor plane 205 combines higher level "instructions" output by a main controller with syndrome measurements that may be used to compute the next operations to be performed on the qubits. The control processor plane module 205 may be adapted to operate at a relatively low level of abstraction. For example, the control processor plane module 205 converts a compiled code, e.g., a code compiled by the host processor 206, to commands suitable for the control and management plane module 204. Consequently, a user may be relieved from having to interact in a direct manner, i.e., needing to understand a functioning of control processor plane directly. Rather, the user may interact with the host processor plane 206. The host processor plane 206 may attach to another computer and act to accelerate the execution of some applications.

The host processor 206 may include a classical computer, e.g., running a conventional operating system with standard supporting libraries for its own operation. The example federated quantum computer system 200 may provide all of the software development tools and services users expect from a computer system, e.g., including an editing environment, a debugging environment, a run-time environment, and the like. The host processor 206 may run the software development tools necessary to create applications to be run on the control processor, which are different from those used to control today's classical computers, as well as provide storage and networking services that a quantum application might require while running. Attaching a quantum processor to a classical computer allows it to utilize all of its features without needing to start entirely from scratch.

Figure 2B:
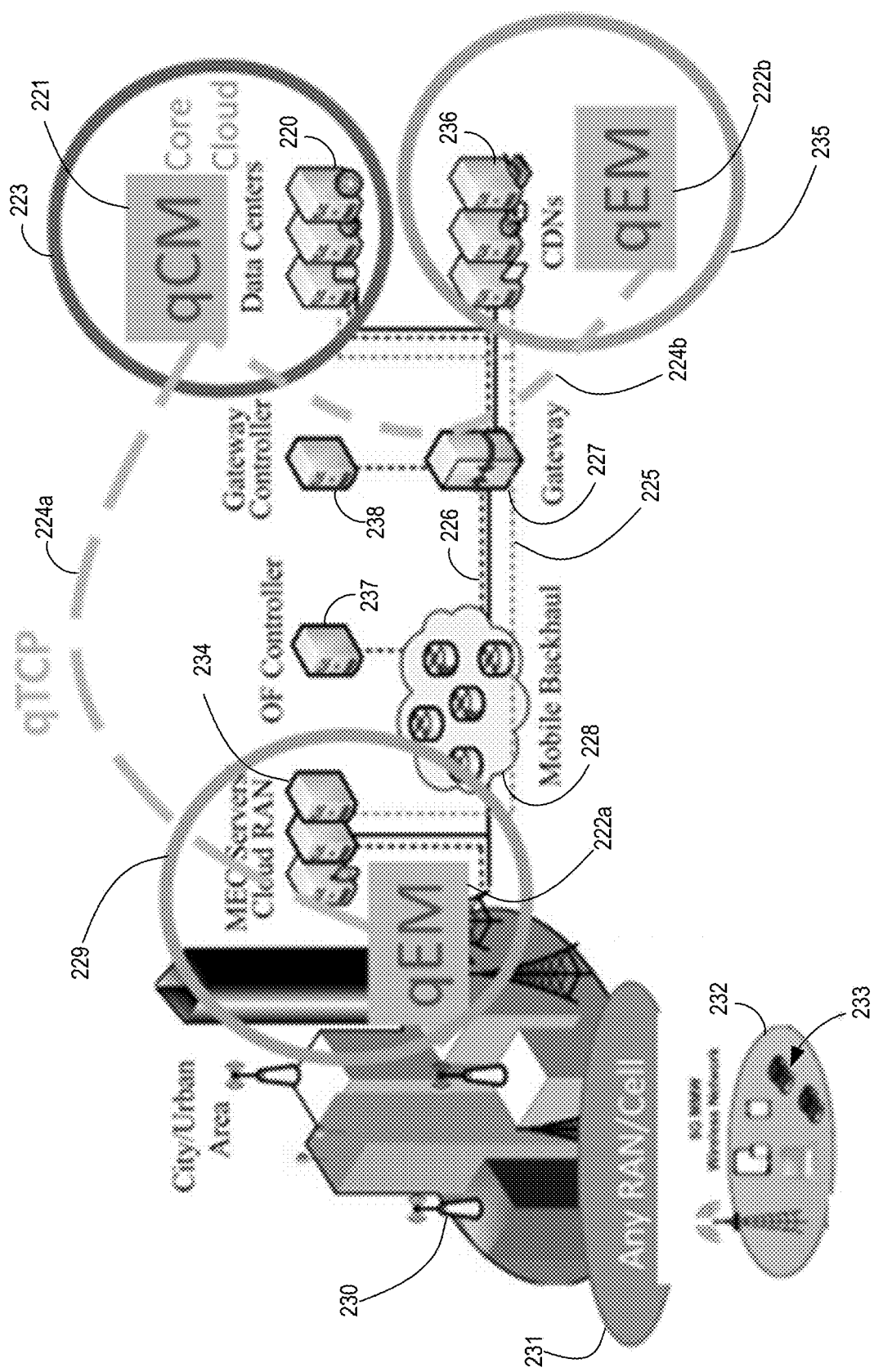
FIG. 2B is a block diagram illustrating another example, non-limiting embodiment of a quantum computing system functioning within the communication network of FIG. 1.

FIG. 2B is a block diagram illustrating another example, non-limiting embodiment of a quantum computing system 220 functioning within the communication network 100 of FIG. 1. The example quantum computing system 220 is implemented in a wireless environment adapted to provide mobile access to quantum computing resources. The quantum computing system 220 includes a quantum central or core module (qCM) 221 hosted on the network via a core network cloud 223. The example core network cloud 223 includes one or more servers that may be hosted, in turn, at one or more core network data centers. The qCM 221 is in communication with a first quantum edge module (qEM) 222a, which is hosted by a mobile edge computing (MEC) environment 229. The MEC environment includes one or more servers 234 that may provide applications, services, and/or access to other back-end services.

The qEM 222a, via the MEC environment 229 provides mobile access to one or more mobile devices 233 operating within a wireless operating range, e.g., a cell coverage area 232 of serviced by a corresponding radio access network (RAN) 231. Wireless communications may include traditional cell coverage, small cell coverage by small cell RANs 230, e.g., in congested urban environments, microcells, femtocells operating in licensed radio frequency (RF) spectrum, and/or other wireless access nodes operating in unlicensed RF spectrum, e.g., according to a wireless networking protocol, such as IEEE 802.11 wireless protocols, WiFi, Bluetooth and the like.

Alternatively or in addition, the quantum computing system 220 may extend quantum processing access to other devices, services, service providers and/or end users via a qEM 222b hosted by a content delivery network (CDN) edge computing environment 235. The qCM 221 is in communication with a second quantum edge module (qEM) 222b, which is hosted by the CDN edge computing environment 235. The qEM 222b, via the CDN environment 235 provides quantum computing access to one or more users, user devices, programs and/or applications in network communication with the CDN 235. The example CDN environment 235 includes one or more servers 236 that may provide applications, services, and/or access to other back-end services.

According to the illustrative example, the qCM 221 and the qEMs 222 are physically separate entities that may be geographically dispersed. The example quantum computing system 220 includes one or more backhaul networks. For example, a first backhaul network 225 provides classical communications connectivity between the qCM 221 and one or more of the qEMs 222. The first backhaul network 225 may include any combination of a dedicated and/or leased wired or cabled network, including power line communications, a radio network, such as a dedicated and/or leased microwave link, a satellite communications link, available leased telecommunications services and the like. In at least some embodiments, the example quantum computing system 220 includes a second, mobile backhaul network 228 communicating via optical fiber 226 and possibly subject to network communications control administered by an optical fiber controller 237. Either or both of the first and second backhaul networks 225, 226 may include one or more gateway devices 227 managing communications between the core cloud 223 and the diverse qEMs 222. The example gateway device is operated and/or otherwise administered via a gateway controller 238.

Without limitation, one or more of the backhaul communication links may include a quantum-enabled communication channel. The example system 220 includes a first quantum transfer control protocol (qTCP) link 224a between the qCM 221 and the first qEM 222a at the MEC 229. Alternatively or in addition, the example system 220 includes a second qTCP link 224b between the qCM 221 and the second qEM 222b at the CDN 235. The quantum enabled links, e.g., qTCP links 224a, 224b, generally 224, may utilize a quantum channel transporting quantum states to facilitate a secure key exchange according to a quantum key distribution (QKD). The secure keys, once exchanged according to the transported quantum states, may be used to secure underlying control and/or data transported via a classical communication channel of the backbone 225, 226. Alternatively or in addition, the quantum enabled links may facilitate transport of underlying control and/or data via quantum teleportation over a quantum channel. It is understood that in at least some embodiments, a classical channel is also required, allowing the qCM 221 and the qEM 222 to exchange state information as may be necessary to obtain information transported by the quantum states.

According to the illustrative example, the qCM 221 interfaces with either or both qEMs 222 over a dedicated high-speed link 225, 226, which might include a qTCP channel 224. In at least some embodiments, the qEM 222a and the MEC 234 may be residing within a common server or common group of servers. It is understood that any of the network elements, including without limitation, the qEM 222, the MEC 229 and the CDN 235 may utilize virtualization.

The quantum-enabled communication channel may extend between a network cloud and one or more wireless access points (WAP), such as wireless local area network (WLAN) hot-spots, to heighten security for Wi-Fi connected mobile devices and/or mobile cellular access terminals, or base stations, to heighten security for 4G and/or 5G connected mobile devices.

The quantum-enabled communication channels may be provisioned upon demand, e.g., in response to detection of potential security threats. Similarly, the quantum-enabled communication channels may be deprovisioned once a communication session has terminated, and/or responsive to a particular application and/or service of an active communication session has terminated, and/or responsive to a handoff of the associated mobile device to a neighboring cell. In at least some embodiments, status of a provisioning and/or current use of a quantum-enabled channel may be shared between one or more neighboring cells, including small cells, microcells and femtocells and between one or more nearby WAPs and/or one or more neighboring cells to facilitate hand-over events. In some embodiments, one or more quantum-enabled channels may be provisioned and/or pre-provisioned in anticipation of a potential handover of a mobile communication session engaged in a communication session relying upon a quantum-enabled channel. It is understood that in at least some instances such provisioning and/or pre-provisioning based on potential hand-over events may not be necessary based on one or more of the nature of the security threat, infrastructure differences of backhaul links and the like.

It is further understood that quantum-enabled communication channels require specialized infrastructure adapted to process information according to quantum states of particles. Such quantum-aware devices and/or systems, e.g., quantum computers, generally impose stringent requirements associated with the generation, storage and/or processing of such quantum particles, as discussed in more detail below. In at least some embodiments the quantum aware systems, such as a quantum aware WLAN base station may be in safe and appropriate accommodating location, such as enterprise corporate sites, airports, and large dual units. With the current approach, after the threat has been detected and contained, a software solution, for example, AMQ, automatically allows the device to rejoin the network risking the same threat again. The ability to add such heightened security, e.g., hardening, on demand allows active communication sessions to proceed, despite the perceived and/or actual confirmed security breach or threat. The disclosed techniques providing a quantum-enabled communication channel on demand, offer improvements over current security solutions, such as better threat proof added security for the highly sensitive content users or mission critical systems.

By implementing a quantum-enabled channel on-demand, e.g., active communication sessions and/or services may proceed with heightened security, without necessitating that they automatically rejoin the network without such quantum-aware provisions that would otherwise risk a recurrence of any threat. Rather, the disclosed techniques mitigate threats by migrating at least a portion of the underlying session communications to a quantum secure path, which may be under a joint control of a classical SDN and a Q-RM.

In at least some embodiments, quantum error correction (QEC) may be applied to quantum computing to protect quantum information from errors due to decoherence and other quantum noise. In view of a "no cloning" theorem, quantum error correction protocols are adapted to detect and correct errors without determining any information regarding the qubit state. Correctable errors may be due to one or more of noise on stored quantum information, faulty quantum gates, faulty quantum preparation, and/or faulty measurements. For example, a multi-qubit measurement may be performed to retrieve information about the error without disturbing the quantum information in the encoded state. Such syndrome measurements may determine whether a qubit has been corrupted, and if so, which one. Moreover, an outcome of a syndrome measurement may identify which physical qubit was affected and in which of several possible ways it was affected.

FIG. 2C is a block diagram illustrating yet another example, non-limiting embodiment of a quantum computing system 240 functioning within the communication network of FIG. 1. According to the illustrative example, the quantum computing system 240 includes a first network 248 providing network access to a first qCM 241a. The quantum computing system 240 includes a first network edge, e.g., a first edge cloud 249a. The first edge cloud 249a includes a first qEM 242a providing one or more users, user devices, and/or applications access to quantum computing resources, such as the first qCM 241a. According to the illustrative example, the first qEM 242a is in communication with a first wireless access point 245 providing one or more mobile devices 246 with wireless access to the first qCM 241a. The first qEM 242 may also be in communication with one or more end user devices 244 via a wired network, such as a local area network (LAN), e.g., via an Ethernet connection, a packet network connection, and TCP connection, and the like. The first qEM 242a, in turn, is in communication with the first qCM 241a via a first communication link 243a. The communication may include a classical communication channel 251a and/or a quantum communication channel 243a.

In at least some embodiments, the quantum computing system 240 includes a second network edge, e.g., a second edge cloud 249b (shown in phantom). The second edge cloud 249b includes a second qEM 242b providing one or more users, user devices, and/or applications proximate to the second edge cloud 249b with access to quantum computing resources, such as the first qCM 241a.

It is envisioned that in at least some embodiments, the same network 248 may provide network access to a second qCM 241b (shown in phantom). Two or more qCMs 241a, 241b, generally 241 may be provided in a manner that adds quantum computing resources in a scalable fashion, e.g., bring a second and subsequent qCM 241b online only when necessary. Such scaling may result in conservation of energy and/or processing power whereby unused qCM spare capacity may be transitioned into a quiescent, or standby state.

The second qCM 241b may be in communication with one or more of the qEMs 249 via the same communication channel 243a, 243c as used for the first qCM 241a. Alternatively or in addition, the second qCM 241b may be in communication with one or more of the qEMs 249 via a different communication channel 243b. Any of the communication channels 243a, 243b, 243c, generally 243 may include, in any combination, a classical communication channel 251b, a quantum communication channel 243c, and/or a combination of both classical and quantum communication channels.

Alternatively or in addition, multiple qCMs 241 may offer different physical infrastructures adapted to accommodate the physical quantum date layer. Different infrastructures may offer different levels of performance, e.g., according to speed, quantum algorithm complexity, and/or different capabilities of entities hosting the different qCMs 241. Consider an example in which a first qCM 241a is brought online according to a then current and/or preferred quantum hardware architecture. At some time later, a second qCM 241b may be brought online when a different and possibly improved quantum hardware architecture is available. It may not make sense to decommission the first qCM 241a, such that both systems may run concurrently providing overlapping quantum processing capacity to users.

In at least some embodiments, the core network 248 may include a qCM controller 250. The qCM controller 250 may monitor status of the one or more qCMs 241, e.g., identifying capacity, processing times, applicable access restrictions, authorizations, charges, and the like. It is envisioned that the qCM controller 250 may provide a scheduling function to coordinate access of any single user to multiple qCMs 241 and/or multiple different users to one or more of the qCMs 241. To this end, the qCM controller 250 may track metrics and/or obtain status information related to the qCMs 241. The qCM controller 250, responsive to such information, may provide messages to one or more of the qEMs 242a, 242b, generally 242, identifying which qCM 241 may be available and/or prescribed at a particular time and/or for a particular quantum algorithm, a particular class of quantum algorithm, a particular requesting user, user application, user device, and the like.

In at least some embodiments, the quantum computing system 240 includes a server 252 in communication with one or more of the first qEM 242a, the second qEM 242b, and the wireless access point 245. The server 252 may be adapted to facilitate quantum computing services provided by the quantum computing system 240. For example, the server 252 may share status information between the different qEMs 242. The status information may relate to processing capacity and/or communication capacity of the respective edge clouds 249. Alternatively or in addition, the status information may relate to general status, processing capacity, qubit capacity, quantum processing delays, que status, wait times, costs, and the like.

In at least some embodiments, the server 252 may be adapted to facilitate mobility of a user device between edge clouds 249. For example, the server 252 may retain information related to user devices, user identifies, user authentications, user device capabilities and the like. The server 252 may also share information related to current, planned and/or past quantum processing activity of users identified, known to and/or otherwise discovered by the edge clouds 249. The server 252 may facilitate handover of a mobile user by exchanging information between the qEMs 242, such as pending quantum processing job status, planned or queued quantum processing job status, and the like.

Figure 2D:
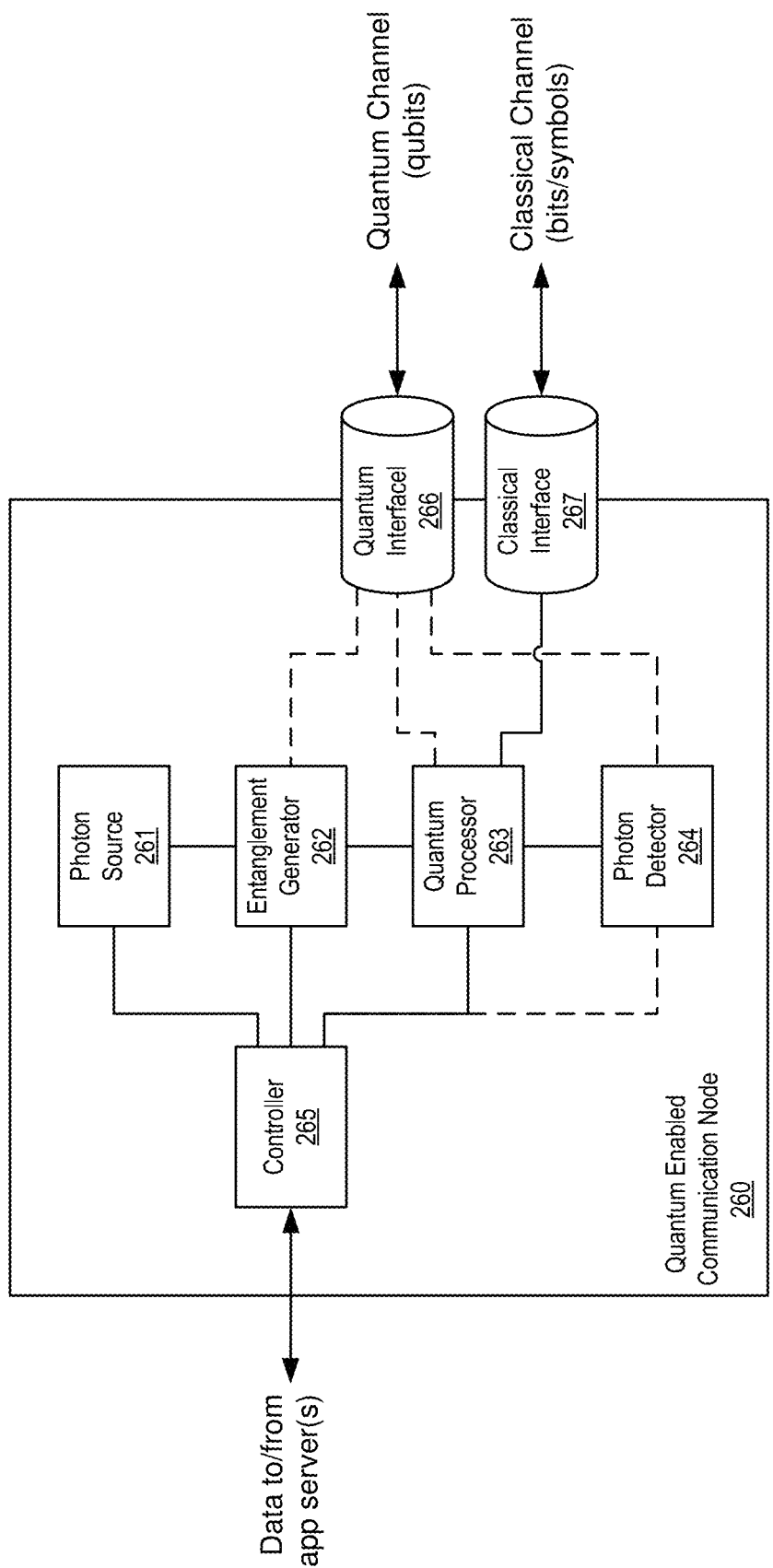
FIG. 2D is a block diagram illustrating an example, non-limiting embodiment of a quantum communication node functioning within the communication network of FIG. 1 and the quantum computing system of FIGS. 2A, 2B and 2C.

FIG. 2D is a block diagram illustrating an example, non-limiting embodiment of a quantum-enabled communication node 260 functioning within the communication network of FIG. 1 and the quantum computing system of FIGS. 2A, 2B and 2C. For example, the quantum-enabled communication node 260 may be associated with and/or incorporated into one or more of the qEM 176, the Q-RAN 172 and/or the qCM 170 (FIG. 1). The example quantum-enabled communication node 260 includes a photon source 261, an entanglement generator 262, a quantum processor 263 and a photon detector 264. The quantum-enabled communication node 260 also includes a quantum node controller 265 in communication with one or more of the photon source 261, the entanglement generator 262, the quantum processor 263 and the photon detector 264.

The photon source 261 can include without limitation, source of photons. Optical sources can include, without limitation, coherent devices, such as lasers or masers, non-coherent devices, such as light emitting diodes (LEDs), and combinations thereof. Lasers can include solid state lasers, e.g., semiconductor diode lasers, gas lasers, chemical lasers fiber lasers, photonic crystal lasers, and so on. Although the term optical source is used, it is understood that devices may operate within and/or without a visible light region of the spectrum, e.g., within the infrared and/or ultraviolet spectra. In at least some embodiments, optical source devices can include millimeter wave and/or microwave devices, e.g., masers, and the like.

In at least some embodiments photons produced by the photon source 261 are coherent, e.g., produced by a laser. The laser can include a pump source to produce energetic coherent photons having an energy above a predetermined minimum threshold. For example, the predetermined minimum threshold level of the energetic photons can be determined according to a predetermined classical optical channel, e.g., such that the energetic photons maintain a minimum energy level after passage through the classical optical channel. In at least some embodiments, the minimum energy level can be determined according to one or more of a photon detector sensitivity, a path loss of the classical optical channel, a noise threshold, a quantum analyzer sensitivity, and the like. In some embodiments, the photon source 261 provides individual photons. Alternatively or in addition, the photon source 261 provides multiple photons, e.g., providing a group of multiple photons according to a single request received from the quantum node controller 265.

In at least some embodiments, the photon source 261 can generate photons having characteristics suitable for an intended application. For example, the photon source 261 can generate photons having a wavelength adapted for telecommunication applications. By way of non-limiting example, the photon wavelengths can be one or more of 850, 1300 and 1550 nm for optical fiber channel applications.

Within the framework of quantum communications over long distances, photons at so-called "telecom" wavelengths have naturally come to the forefront as ideal support for quantum information because of their very weak interaction with the environment and of the low losses on propagation in standard optical fibers. Telecom wavelengths are defined by the International Telecommunications Union (ITU) in the form of standardized frequency bands (for example O, E, S, C, L, U). However, although very low, the transmission losses set a limit beyond which communication is no longer possible since the rate of detected photons becomes lower than the noise rate in the detector which remains the main limitation of the signal-to-noise ratio.

In at least some embodiments, the entanglement generator 262 includes a quantum state adjustor and/or selector. A source for emitting entangled photons, such as the entanglement generator 262, emits pairs of photons correlated on one of their quantum observables. Stated otherwise, the quantum state of each of the photons taken individually cannot be defined. For example, the entanglement generator 262 may receive photons from the photon source 261, split the photons using a nonlinear crystal, exhibiting spontaneous parametric down-conversion to obtain entangled photon pairs. The entangled photons may be processed within the entanglement generator 262 and/or the quantum processor 263 to obtain entangled photons. By way of nonlimiting example, the processing may include filtering the photons according to different, e.g., orthogonal filters to selectively obtain entangled photons having a preferred polarization.

Alternatively or in addition, the entangled photons may be adapted according to their angular orbital momentum. Devices adapted for altering an orbital angular momentum include, without limitation, spiral phase plates. Spiral phase plates, or mirrors, can include spiral-shaped pieces of crystal and/or plastic that are engineered specifically to a predetermined topological charge and incident wavelength. Adjustable spiral phase plates can be made by providing an adjustable separation, e.g., by moving a wedge between two sides of a split or cracked piece of plastic. It is envisioned that other devices can be used to produce vortices of a photon or photon beam, such as a hologram, a deformable mirror, a birefringent liquid crystal plate, sometimes referred to as a q-plate. For example, a q-plate with a topological charge "q" can generate a ±2q charge vortex in an optical beam based on polarization of an input beam. Applications of orbital angular momentum devices, including modulators and demodulators and/or detectors are disclosed in U.S. patent application Ser. No. 16/211,809, entitled "Free-Space, Twisted Light Optical Communication System," filed on Dec. 6, 2018, the entire teachings of which are incorporated herein by reference in its entirety.

The orbital angular momentum of light refers to a component of angular momentum of a light beam or photon that is dependent on a field spatial distribution, and not on a polarization. High-order orbital angular momentum is a quantum mechanical state, one of the few that can be observed at the macroscopic level. It has become an attractive branch of studied due one its most intensely examined phenomena, Optical Vortices (OVs), which has found numerous applications, including; the ability to spin microscopic objects (known as an optical tweezer), create new forms of imaging systems, and behaves within nonlinear materials to give new insights into quantum optics.

In an optical vortex, otherwise known as "twisted light" or "topological charge", light is twisted like a corkscrew around its axis of travel. Because of the twisting, the light waves at the axis itself cancel each other out. When projected onto a flat surface, an optical vortex looks like a ring of light, with a dark hole in the center. This corkscrew of light, with darkness at the center, is called an optical vortex.

In some embodiments, the entanglement generator 262 provides one or more of the entangled photons for application to a source endpoint of a quantum teleportation system, e.g., a quantum transmitter, a destination endpoint of a quantum teleportation system, e.g., a quantum receiver or detector, and/or a quantum relay or repeater. Alternatively or in addition, the entanglement generator 262 provides one or both qubits of an entangled photon pair to a storage device. The quantum particles may be transported over a quantum channel via a quantum channel interface 266. classical information, e.g., identifying an observed quantum state may be conveyed to one or more communication nodes, e.g., the Q-WLAN and/or the Q-FES over a classical channel, via a classical channel interface 267. Data may be exchanged between the quantum-enabled communication node 260 and one or more external devices, such as the mobile communications device 124, and/or the back-end services.

The quantum node controller 265 may be adapted to implement one or more instructions and/or rules that initiate generation of entangled photon pairs or qubits having a predetermined label or tag value impressed on the photon, e.g., by way of a photon's orbital angular momentum. The generated qubits can be used as generated and/or stored in a storage element for later retrieval. It is understood that in at least some embodiments, one or more of the quantum enabled communication node 260 and/or the separate qubit source 219 (FIG. 2) may develop a reservoir or pool of tagged or labeled qubits that can be stored and retrieved on an as needed basis.

Although the system elements of the example entangled photon generator 262 are presented in a particular order, it is understood that the ordering of one or more of the system elements can be changed. For example, photon may be tagged and/or otherwise modified according to an identification label, e.g., a number. Such tagged photons may be arranged after the entanglement generator 262 to tag the entangled photon pairs. Alternatively or in addition, a photon tagger may be arranged after the controller 265 to tag the entangled photons and/or entangled photon pairs retrieved from the storage element.

It is understood that energy injected into a quantum system can disrupt a fragile entangled photon pair relationship. Furthermore, reading a quantum particle in a state of superposition will collapse the superposition. For these reasons, a traditional approach of photon amplification used in optical fiber networks is not suitable for entangled photons that are in a state of superposition. To amplify a regular photon, one combines it with another light pulse of a higher intensity, their combined intensity if an average of the original constituents. But they have to be separated so that the original photon stream regains data coherence. Therefore, traditional amplification processes would disrupt quantum entanglement, and the separation of the combined light pulse would act like a measurement and shatter the superposition. This can be overcome by using an entanglement swapping strategy. The disclosed photon creation process supports a practical scalability, providing both high performance and increased efficiency, by providing substantially pure photon "blanks" upon which to generate entangled pairs as disclosed in U.S. patent application Ser. No. 16/426, 891, entitled "System and Method for Provisioning of Entangled-Photon Pairs," filed on May 30, 2019, the entire teachings of which are incorporated herein by reference in its entirety.

Figure 2E:
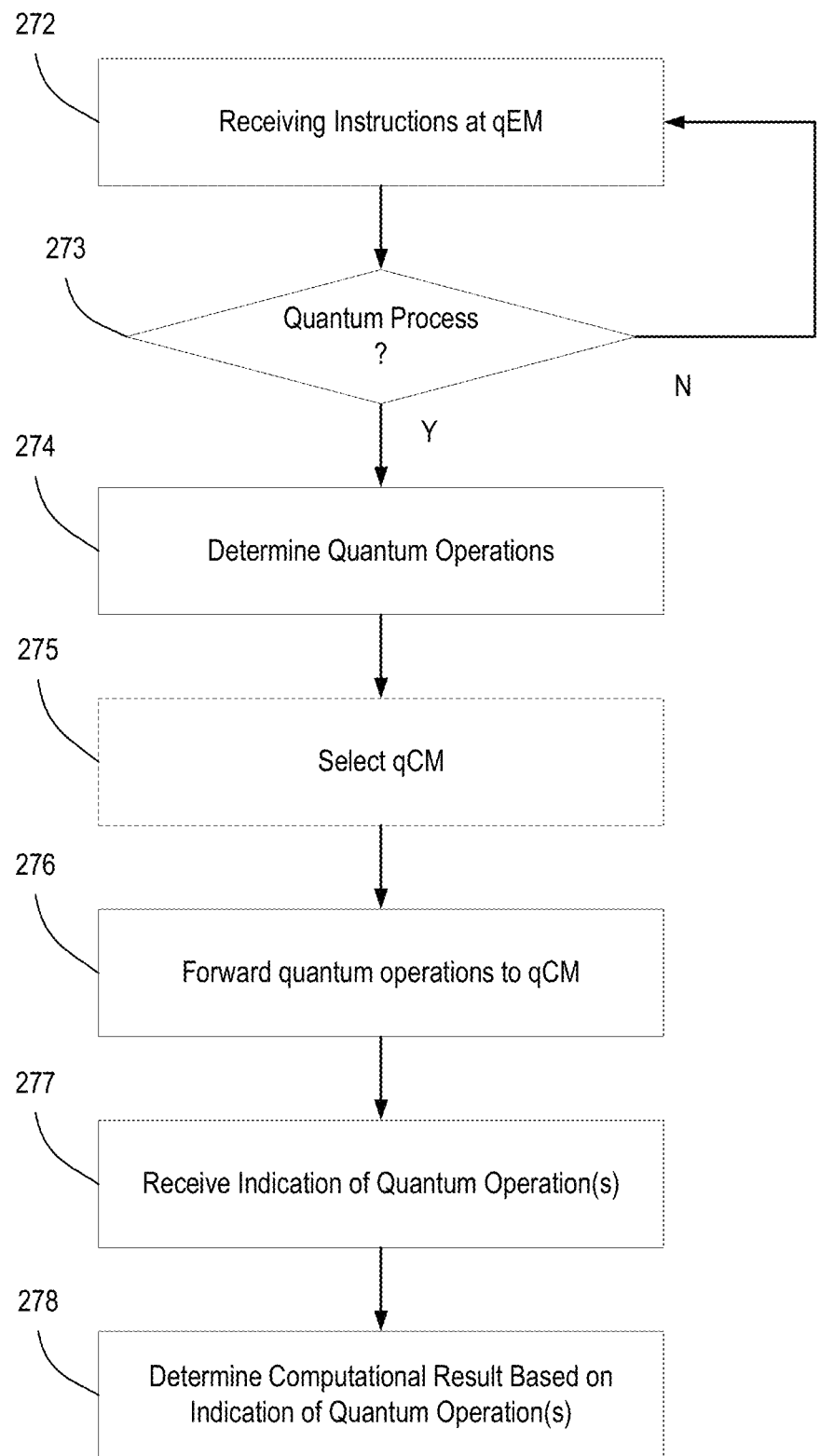
FIG. 2E depicts an illustrative embodiment of a process in accordance with various aspects described herein.

FIG. 2E depicts an illustrative embodiment of a process 270 in accordance with various aspects described herein. According to the example process 270, instructions are received at 272. In at least some embodiments, the instructions may be received from a host processor module 206 (FIG. 2A). For example, the host processor may be implementing a program and/or an application. In at least some embodiments, the program may implement and/or otherwise access a quantum algorithm. The quantum algorithm, in turn, may require quantum processes implemented according to a quantum computing architecture, such as the example federated quantum computing systems disclosed herein. The control processor plane module 205 may receive and/or otherwise interpret instructions from the host processor. Alternatively or in addition, the control processor plane module 205 may receive instructions from another source, such as a remote computer, a networked device, such as a workstation, a laptop computer, a mobile device, a machine, e.g., according to IoT applications, and so forth.

A determination is made at 273 as to whether the instruction relate to a quantum process. In some embodiments, the determination is made by the host processor 206, e.g., interpreting an instruction to determine wither it relates to a quantum algorithm. Alternatively or in addition, the determination is made by the control processor plane module 205. In some embodiments, quantum algorithms may be identified explicitly, e.g., in a function call, data type, etc. Alternatively or in addition, an inference may be drawn from a detail of the instruction alone and/or in association with other instructions, such as preceding and/or subsequent programming instructions. To the extent that the instructions do not relate to a quantum process, the process 270 continues to receive instructions at 272 and analyze the instructions, e.g., in a like manner, at 273 to determine whether such subsequent instructions may relate to a quantum process.

To the extent it is determined at 273 that the instructions do relate to a quantum process, a further determination is made at 274 as to whether quantum operations are required. Quantum operations include those operations that require manipulation of quantum entities in the quantum data plane module 203. In at least some embodiments, quantum operations initiate a generation and/or access to a qubit, a storage of a qubit, a measurement of a physical property of a qubit. Alternatively or in addition, the quantum operations may require an interaction between qubits, such as a quantum gate operation in which at least two quantum particles are brought into proximity to interact according to a quantum gate operation. Whether an operation is a quantum operation may be determined by an interpretation of the operation to associate the operation with a group of known and/or previously encountered quantum operations. Alternatively or in addition, whether an operation is a quantum operation may be determined by inference, e.g., according to a parameter of the operation, a context of the operation, e.g., according to a generally known and/or previously encountered algorithm, and/or in association with previous and/or subsequent operations.

In at least some embodiments, a particular qCM may be selected from among a group of qCMs at 275 (shown in phantom). Some federated quantum processing systems may provide a single qCM entity that is shared among geographically disperse qEMs. In some embodiments, however, the federated quantum processing system may provide more than one qCMs. Selection of a particular qCM may be made according to one or more criteria, such as a comparison of the quantum operation to an underlying architecture of the qCMs. To the extent the qCMs differ, one architecture may be better suited to one type of quantum operation, whereas another qCM architecture may be better suited to another type of quantum operation, the selection being made at least in part according to an efficiency of matching quantum operation to preferred qCM architecture.

Alternatively or in addition, the qCM may be selected according to status information obtained from the qCM. Status information may include, but not be limited to processing qCM capacity and/or communication and/or general status information, such as processing capacity, qubit capacity, quantum storage capacity, quantum processing delays, que status, wait times, costs, and the like. Other qCMs may be allocated to preferred qEMs and/or preferred users and/or preferred user devices, such that one qCM may be identified as being preferred over another. The quantum operations, once obtained by the control processor plane 205, are forwarded to the qCM at 276. To the extent one of a number of qCMs have been selected, the quantum operations are sent to the appropriate qCM.

One or more indications of a performance of the quantum operations, e.g., by the quantum date plane module 203 are received at 277. The indications may include results of a quantum process, such as a quantum state of a quantum particle and/or quantum states of quantum particles. Alternatively or in addition the indications may include classical information, e.g., a status report indicating a quantum process has been completed, a storage location of a quantum entity, etc.

A determination may be made at 278 to obtain a computational results based on an indication of the quantum operation. The result may be a partial result, e.g., a result that is processed further according to the quantum algorithm, e.g., directing the algorithm in one of various different ways according to a preliminary and/or interim result. Alternatively or in addition, the result may be a final result, e.g., as in a solution of the algorithm.

While for purposes of simplicity of explanation, the process is shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
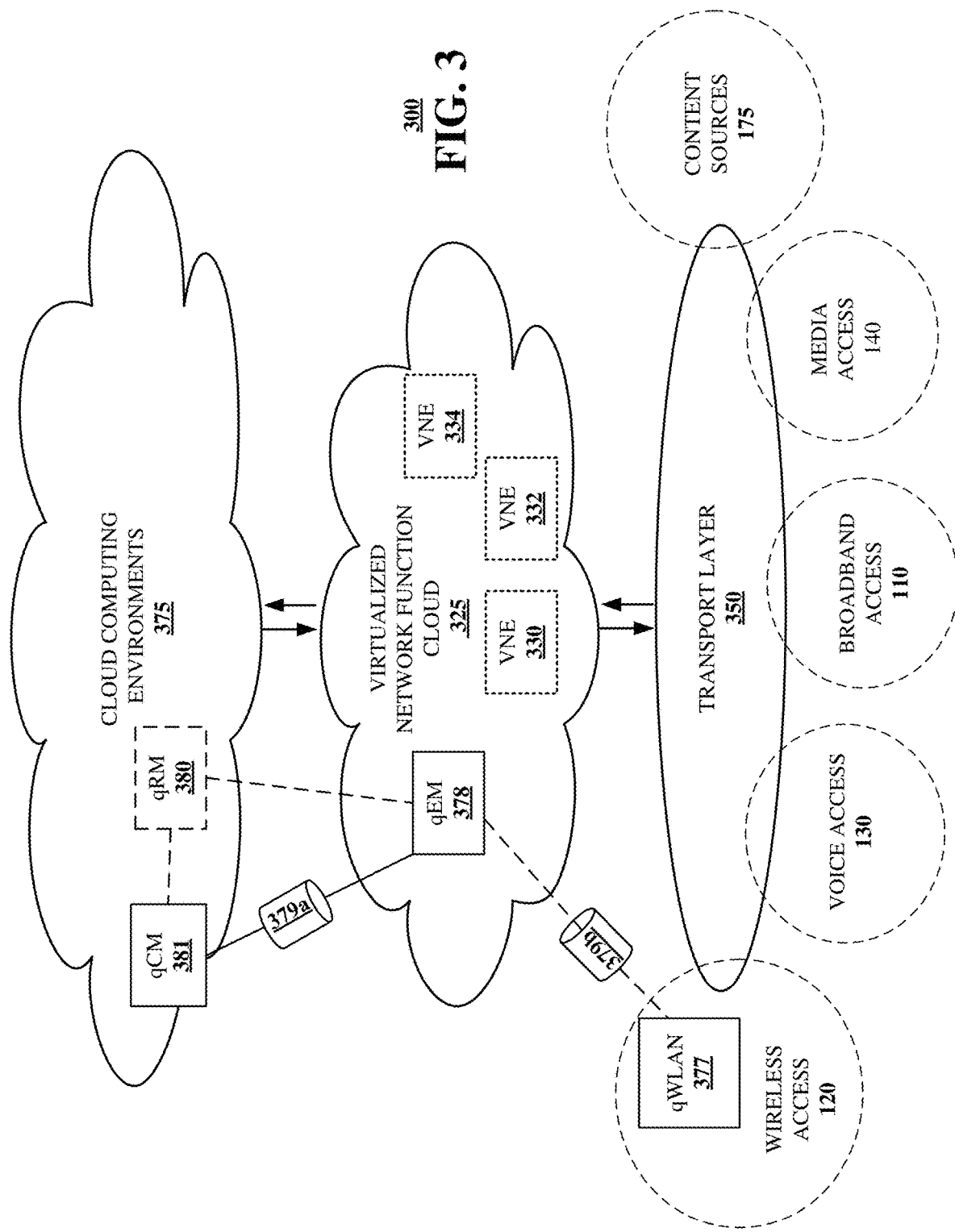
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of the federated quantum computer system 200, the communication node 260 and the processes 270 presented in FIGS. 1, 2A, 2B, 2C, 2D and 3. For example, the virtualized communication network 300 may facilitate in whole or in part, a federated quantum computing architecture by which a centralized quantum core module (qCM) 381 functions in cooperation with one or more quantum edge module (qEM) 378 to extend quantum computing to remote systems and/or devices via a networked architecture.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

The example virtualized communication network 300 includes a quantum aware substrate adapted to perform computational and/or communication functions based at least in part upon quantum mechanical principles. According to the quantum-aware substrate, the wireless access 120 network element may one or more quantum-aware wireless access points and/or quantum-aware radio access networks. According to the illustrative example, the wireless access 120 include a quantum wireless LAN (qWLAN) 377. Similarly, the virtualized network function cloud 325 may include one or more quantum-aware network elements. According to the illustrative example, the virtualized network function cloud 325 includes at least one qEM 378. The aWLAN 377 and the qEM 378 may include one or more elements of the illustrative quantum enabled communication node (FIG. 2D).

Continuing with the illustrative example, the cloud computing environment 375 may include a quantum resource manager (qRM) 380. The qRM 380 may receive instructions from an SDN controller of the cloud computing environment 375 to provision and/or otherwise associate one or more quantum channels 379a, 379b, generally 279, with a wireless communication link. The example virtualized communication network 300 may include one or more qCM 381. The qCM 381 may be implemented in whole or in part according to the cloud computing environment 375, e.g., associated with the virtualized network function cloud 325. Alternatively or in addition, the qCM 381 may be separate from the cloud computing environment 375, e.g., as a stand-alone device or system. The qCM 381 is adapted to receive a sequence of quantum operations from the qEM 378. The qCM 381 is further adapted to physically manipulate one or more quantum bits according to the sequence of quantum operations to carry out one or more quantum mechanical processes adapted to yield a useful quantum mechanical result. The qCM 381 may inform the cloud computing environment 375, e.g., via a SDN controller. The SDN controller, in turn, may implement one or more rules and/or policies to coordinate a provisioning of a quantum-enabled communication channel and/or a provisioning of quantum computing resources. To the extent it is determined that a quantum-enabled communication channel is necessary, the qRM 380 may coordinate quantum-aware assets, such as one or more of the qCM 381, the qEM 378 and/or the qWLAN 377 to provision the quantum-enabled communication channel.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
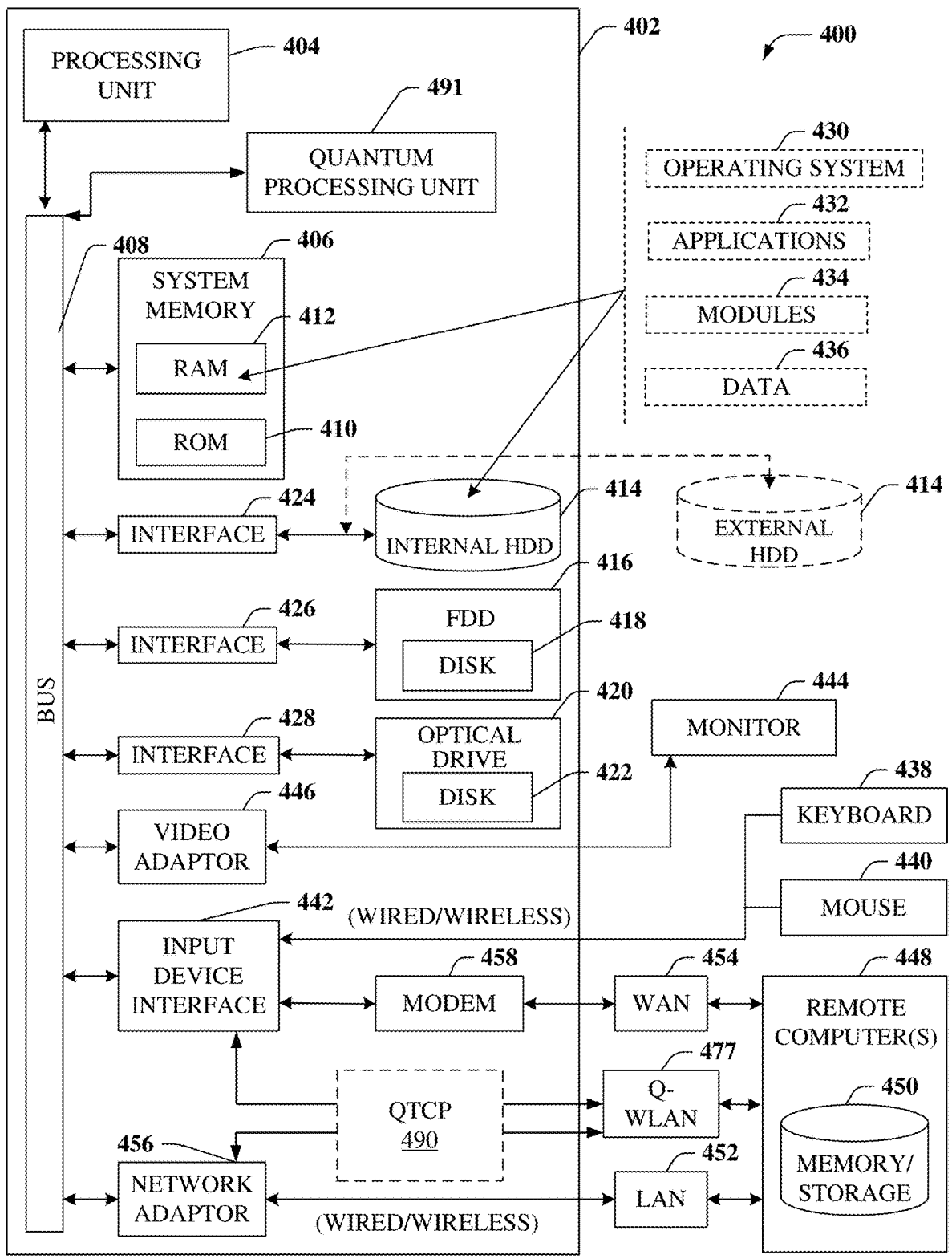
FIG. 4 is a block diagram of an example, non-limiting embodiment of a computing environment in accordance with various aspects described herein.

Turning next to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, the computing environment 400 may facilitate in whole or in part, a provisioning of, an establishment of and/or an activation of a quantum-enabled communication channel between a wireless access point and a mobile core network responsive to a request for access to quantum computing resources, and securing mobile backhaul communications according to an exchange of quantum entangled particles via the quantum channel. Alternatively or in addition, the computing environment 400 may facilitate in whole or in part, a provisioning and/or orchestration of quantum computing resource to a group of geographically dispersed remote network entities.

Generally, program modules comprise routines, programs, components, data structures, etc., that perform particular tasks or implement particular abstract data types. Moreover, those skilled in the art will appreciate that the processes may be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any process or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example computing environment 400 can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the processes described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and processes described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

The example computer environment 400 includes quantum aware elements or subsystems adapted to perform computational and/or communication functions based at least in part upon quantum mechanical principles. According to the quantum-aware elements, the computer 402 may include one or more elements of the illustrative quantum enabled communication node 260 (FIG. 2D). According to the illustrative example, the computer 402 include a quantum processor 491, which may include one or more of a qubit source, an entanglement generator, a quantum processor and/or a qubit detector. Similarly, the example computer environment 400 may include one or more separate quantum-aware network elements. According to the illustrative example, the computer environment 400 includes at least one quantum communication processor, such as a qTCP module 490 in communication with a qWLAN 477, which may include one or more elements of the illustrative quantum enabled communication node 260. The quantum processing unit may include functionality that implements one or more of the four-layer quantum computing architecture. For example, the quantum processing unit 491 may implement one or more of the host processor and/or the control processor plane module 205, 206 of the qEM 176, 202, 222, 242 (FIGS. 1, 2A, 2B and 2C). Alternatively or in addition, the quantum processing unit 491 may implement one or more of the control and management plane module 204 and/or the quantum data plane module 203 of the qCM 170, 201, 221, 241 (FIGS. 1, 2A, 2B and 2C).

Figure 5:
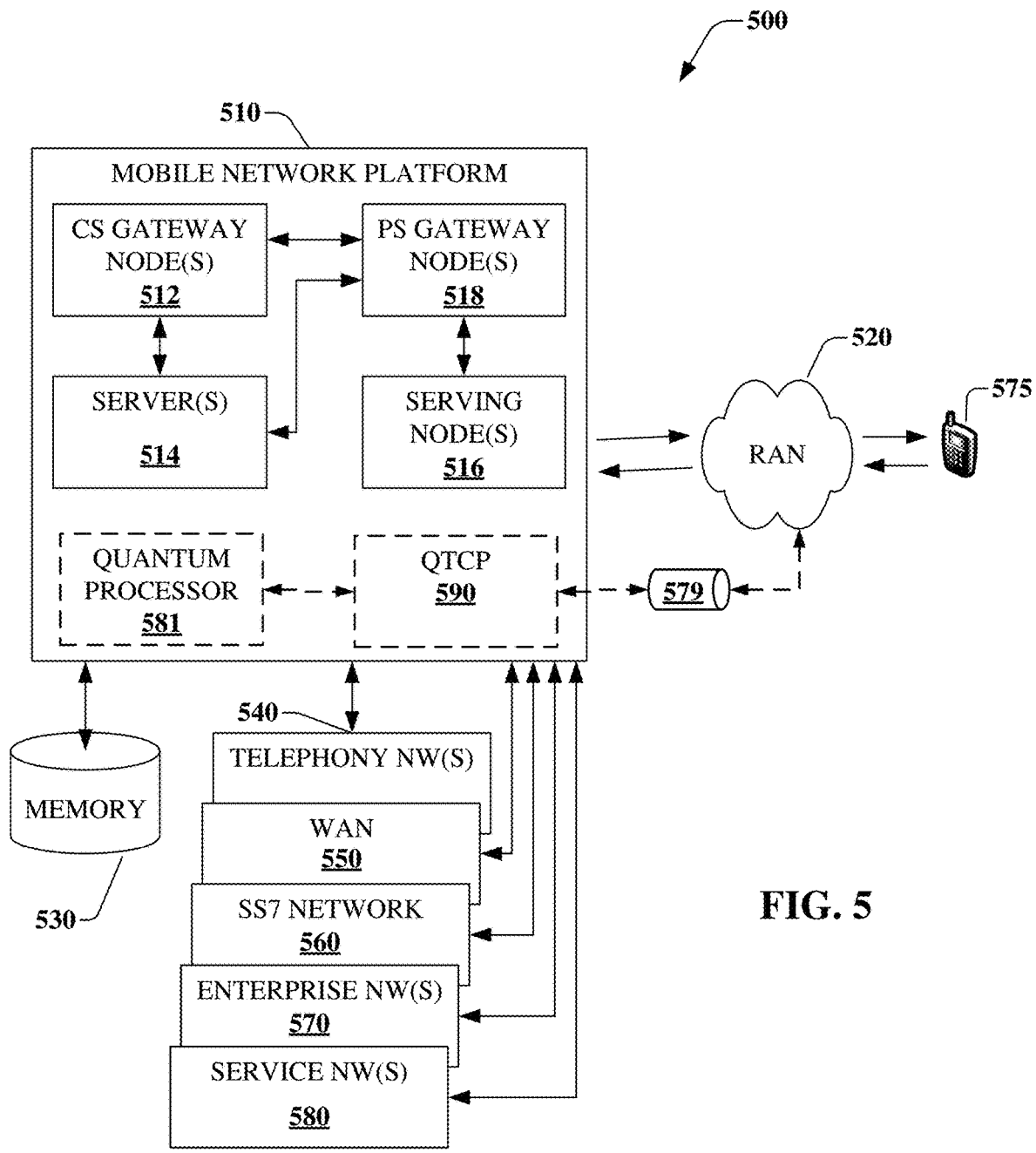
FIG. 5 is a block diagram of an example, non-limiting embodiment of a mobile network platform in accordance with various aspects described herein.

Turning now to FIG. 5, a mobile network environment 500 including an embodiment of a mobile network platform 510 is shown that is an example of network elements 150, 152, 154, 156, and/or VNEs 330, 332, 334, etc. For example, the platform 510 may facilitate in whole or in part, a provisioning of, an establishment of and/or an activation of a quantum-enabled communication channel between a wireless access point and a mobile core network responsive to a request for access to quantum computing resources, and securing mobile backhaul communications according to an exchange of quantum entangled particles via the quantum channel. Alternatively or in addition, the computing environment 500 may facilitate in whole or in part, a provisioning and/or orchestration of quantum computing resource to a group of geographically dispersed remote network entities. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

The mobile network environment 500 includes quantum aware elements or subsystems adapted to perform computational and/or communication functions based at least in part upon quantum mechanical principles. According to the quantum-aware elements, the mobile network platform 510 may include one or more elements of the illustrative quantum enabled communication node 260 (FIG. 2D). According to the illustrative example, the mobile network platform 510 include a quantum processor 590, which may include one or more of a qubit source, an entanglement generator, a quantum processor and/or a qubit detector. Alternatively or in addition, the quantum processor may be adapted to participate in quantum computing processes. For example, the quantum processor 581 may be adapted to implement one or more processes of the host processor 206, and/or the control processor plane module 205 of the qEM 202, and/or one or more processes of the control and management plane module 204, and/or the quantum data plane module 203 of the qCM 201 (FIG. 2A). Similarly, the example mobile network platform 510 may include one or more separate quantum-aware network elements according to the various techniques disclosed herein. In at least some embodiments, the mobile network platform 510 may include a quantum communication processor, such as a qTCP module 590 adapted to communication with the RAN 520 via quantum enabled link 579 according to the various techniques disclosed herein.

Figure 6:
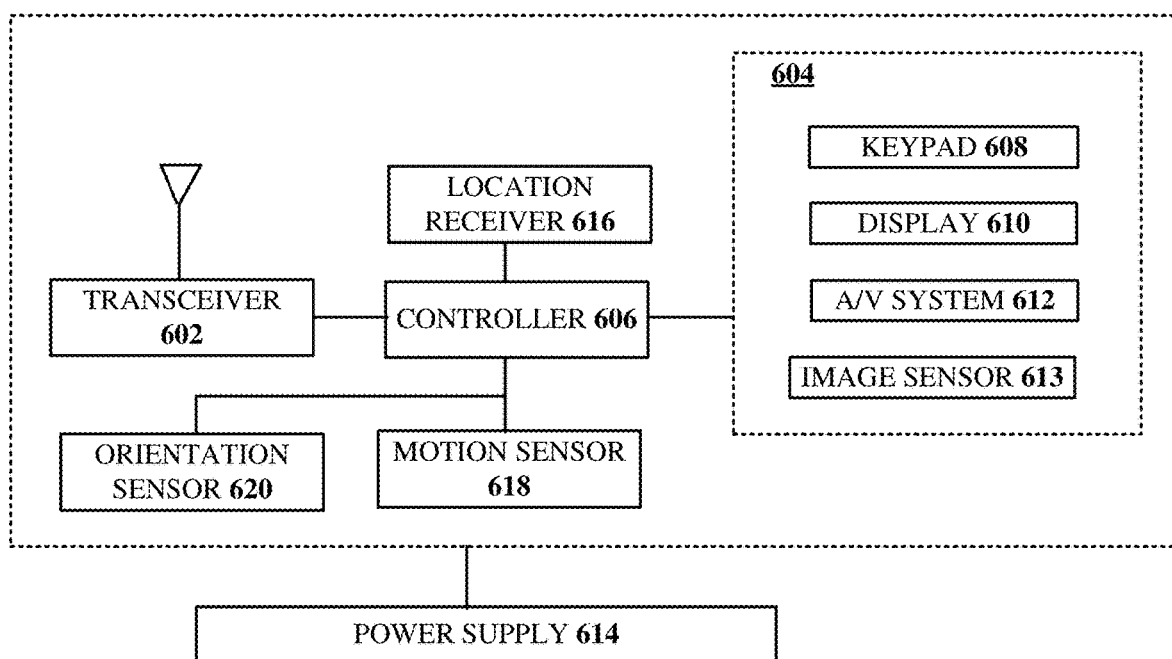
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, the computing device 600 may facilitate in whole or in part, a provisioning of, an establishment of and/or an activation of a quantum-enabled communication channel between a wireless access point and a mobile core network responsive to a request for access to quantum computing resources, and securing mobile backhaul communications according to an exchange of quantum entangled particles via the quantum channel. Alternatively or in addition, the computing environment 400 may facilitate in whole or in part, a provisioning and/or orchestration of quantum computing resource to a group of geographically dispersed remote network entities.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or processes herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A quantum computing system, comprising:
 a first quantum edge processing system including a processor; and
 a memory that stores executable instructions that, when executed by the first quantum edge processing system, facilitates performance of operations, the operations comprising:
  receiving instructions for implementing a quantum algorithm adapted to obtain a computational result according to a quantum mechanical process;

determining, based on one or more received instructions of the instructions for implementing a quantum algorithm, that the one or more received instructions are related to a quantum process;

responsive to the determining that the one or more received instructions are related to a quantum process, determining a sequence of quantum operations according to the instructions for implementing the quantum algorithm, wherein the sequence of quantum operations is adapted to physically manipulate a plurality of quantum bits according to the quantum mechanical process;

selecting a geographically separated quantum central module from a plurality of quantum central modules, each respective quantum central module comprising a particular respective physical layer architecture, wherein the geographically separated quantum central module is located remotely from the first quantum edge processing system, wherein the selecting the geographically separated quantum central module is based on comparing one or more quantum operations of the sequence of quantum operations with respective physical layer architectures of the plurality of quantum central modules, forming a selected geographically separated quantum central module;

forwarding the sequence of quantum operations to the selected geographically separated quantum central module, via a communication channel, the selected geographically separated quantum central module implementing the quantum mechanical process to obtain a computational result; and receiving the computational result from the selected geographically separated quantum central module via the communication channel.

2. The quantum computing system of claim 1, further comprising converting compiled code to commands adapted for execution by a control and measurement layer of the selected geographically separated quantum central module, wherein the commands are determined according to a respective physical layer architecture of the selected geographically separated quantum central module.

3. The quantum computing system of claim 2, wherein the respective physical layer architecture of the selected geographically separated quantum central module comprises one of a trapped-ion qubit architecture, a superconducting qubit architecture or a photon-based qubit architecture.

4. The quantum computing system of claim 1, further comprising selecting the geographically separated quantum central module from the plurality of quantum central modules to obtain a selected quantum central module comprising a particular physical layer architecture, wherein the particular physical layer architecture is adapted to the one or more quantum operations.

5. The quantum computing system of claim 4, wherein the plurality of quantum central modules comprise a plurality of respective different physical layer architectures, wherein the determining of the sequence of quantum operations is based on the particular physical layer architecture of the plurality of respective different physical layer architectures of the selected quantum central module.

6. The quantum computing system of claim 1, wherein a quantum measurement is adapted to perform a logical gate operation of the plurality of quantum bits of the selected geographically separated quantum central module to obtain a quantum gate result, wherein the computational result is based on the quantum gate result.

7. The quantum computing system of claim 6, wherein the quantum measurement is adapted to measure a physical property of a quantum bit of the plurality of quantum bits of the selected geographically separated quantum central module, wherein the physical property comprises a quantum state of the quantum bit.

8. The quantum computing system of claim 1, wherein the forwarding of the sequence of quantum operations to the geographically separated quantum central module further comprises exchanging quantum information with the selected geographically separated quantum central module according to a quantum teleportation process.

9. The quantum computing system of claim 1, further comprising receiving the computational result via the communication channel, wherein the determining of the sequence of quantum operations is further based upon the computational result.

10. A method, comprising:

obtaining, by a processing system including a processor of a first quantum edge processing system, instructions for implementing a quantum algorithm adapted to obtain a computational result according to a quantum mechanical process;

determining, by the processing system, based on one or more obtained instructions of the instructions for implementing a quantum algorithm, that the one or more obtained instructions are related to the quantum mechanical process;

responsive to the determining that the one or more obtained instructions are related to the quantum mechanical process, determining, by the processing system, a sequence of quantum operations according to the instructions for implementing the quantum algorithm, wherein the sequence of quantum operations is adapted to physically manipulate a plurality of quantum bits according to the quantum mechanical process;

selecting, by the processing system, a selected geographically separated quantum central module from a plurality of quantum central modules, each respective quantum central module of the plurality of quantum central modules comprising a particular respective physical layer architecture, wherein the selected geographically separated quantum central module is located remotely from the first quantum edge processing system, wherein the selecting the selected geographically separated quantum central module is based on comparing one or more quantum operations of the sequence of quantum operations with respective physical layer architectures of the plurality of quantum central modules;

forwarding, by the processing system, the sequence of quantum operations to the selected geographically separated quantum central module, via a communication channel, the selected geographically separated quantum central module implementing the quantum mechanical process to obtain a computational result; and obtaining, by the processing system, the computational result from the selected geographically separated quantum central module via the communication channel.

11. The method of claim 10, further comprising converting, by the processing system, compiled code to commands adapted for execution by a control and measurement layer of the selected geographically separated quantum central module, wherein the commands are determined according to a particular physical layer architecture of the selected geographically separated quantum central module.

12. The method of claim 11, wherein the particular physical layer architecture of the selected geographically separated quantum central module comprises one of a trapped-ion qubit architecture, a superconducting qubit architecture or a photon-based qubit architecture.

13. The method of claim 10, further comprising selecting, by the processing system, the selected geographically separated quantum central module from a plurality of quantum central modules to obtain the selected geographically separated quantum central module comprising a particular physical layer architecture.

14. The method of claim 13, wherein the plurality of quantum central modules comprise a plurality of different physical layer architectures, wherein the determining of the sequence of quantum operations is based on the particular physical layer architecture of the plurality of different physical layer architectures of the selected geographically separated quantum central module.

15. The method of claim 10, wherein a quantum measurement is adapted to perform a logical gate operation of the plurality of quantum bits of the selected geographically separated quantum central module to obtain a quantum gate result, wherein the computational result is based on the quantum gate result.

16. The method of claim 15, wherein the quantum measurement is adapted to measure a physical property of a quantum bit of the plurality of quantum bits of the selected geographically separated quantum central module, wherein the physical property comprises a quantum state of the quantum bit.

17. A non-transitory machine-readable medium, comprising executable instructions that, when executed by a processing system including a processor of a first quantum edge processing system, facilitate performance of operations, the operations comprising:

obtaining instructions for implementing a quantum algorithm adapted to obtain a computational result according to a quantum mechanical process;

determining based on one or more obtained instructions of the instructions for implementing a quantum algorithm, that the one or more obtained instructions are related to performing the quantum mechanical process;

responsive to the determining that the one or more obtained instructions are related to performing the quantum mechanical process, generating a sequence of quantum operations according to the instructions for implementing the quantum algorithm, wherein the sequence of quantum operations is adapted to physically manipulate a plurality of quantum bits according to the quantum mechanical process;

selecting a selected geographically separated quantum central module from a plurality of quantum central modules, each respective quantum central module of the plurality of quantum central modules comprising a particular respective physical layer architecture, wherein the selected geographically separated quantum central module is located remotely from the first quantum edge processing system, wherein the selecting the selected geographically separated quantum central module is based on comparing one or more quantum operations of the sequence of quantum operations with respective physical layer architectures of the plurality of quantum central modules;

providing the sequence of quantum operations to the selected geographically separated quantum central module, via a communication channel, the selected geographically separated quantum central module implementing the quantum mechanical process to obtain a computational result; and receiving the computational result from the selected geographically separated quantum central module via the communication channel.

18. The non-transitory machine-readable medium of claim 17, further comprising converting compiled code to commands adapted for execution by a control and measurement layer of the selected geographically separated quantum central module, wherein the commands are determined according to a physical layer architecture of the selected geographically separated quantum central module.

19. The non-transitory machine-readable medium of claim 18, wherein the physical layer architecture of the selected geographically separated quantum central module comprises one of a trapped-ion qubit architecture, a superconducting qubit architecture or a photon-based qubit architecture.

20. The non-transitory machine-readable medium of claim 17, further comprising selecting the selected geographically separated quantum central module from the plurality of quantum central modules to obtain a selected quantum central module, wherein the plurality of quantum central modules comprises a plurality of different physical layer architectures, wherein the generating of the sequence of quantum operations is based on a particular physical layer architecture of the plurality of different physical layer architectures of the selected quantum central module.

\* \* \* \* \*